United States Patent [19]
Takaki et al.

[11] Patent Number: 5,049,610
[45] Date of Patent: Sep. 17, 1991

[54] FIBER-REINFORCED RUBBER COMPOSITION AND PRODUCTION PROCESS AND USE THEREOF

[75] Inventors: Takeshi Takaki; Kouhei Kaijiri; Denichi Oda; Kunio Oda; Hideo Kurihara; Takeshi Tanabe, all of Ichihara, Japan

[73] Assignee: Ube Industries, Ltd., Yamaguchi, Japan

[21] Appl. No.: 437,811

[22] Filed: Nov. 17, 1989

Related U.S. Application Data

[62] Division of Ser. No. 97,101, Sep. 16, 1987, Pat. No. 5,006,603.

[30] Foreign Application Priority Data

Sep. 26, 1986 [JP] Japan ............................. 61-225858
Oct. 9, 1986 [JP] Japan ............................. 61-240821
Nov. 18, 1986 [JP] Japan ............................. 61-272822
Nov. 18, 1986 [JP] Japan ............................. 61-272823
Jan. 21, 1987 [JP] Japan ............................. 62-12005
Jan. 21, 1987 [JP] Japan ............................. 62-12006

[51] Int. Cl.$^5$ .................... C08K 3/04; C08L 9/00; C08L 71/00
[52] U.S. Cl. .................... 524/514; 523/203; 523/204; 152/209 R; 152/547
[58] Field of Search .................... 152/450, 209, 547; 523/204, 205; 525/178; 524/514

[56] References Cited

FOREIGN PATENT DOCUMENTS 1213995 11/1986 Canada .
59-43041 3/1984 Japan .

Primary Examiner—Allan M. Lieberman
Attorney, Agent, or Firm—Finnegan, Henderson, Farabow, Garrett & Dunner

[57] ABSTRACT

A reinforced rubber composition comprising 100 parts by weight of a vulcanizable rubber including 1 to 100 parts by weight of fine short fibers of a fiber forming polyamide buried therein, and the polyamide and the rubber are bonded through a silane coupling agent. This reinforced rubber composition is suitable for use as automobile tires and the parts thereof and rubber products such as, rubber houses, rubber belts, rubber parts for automobiles, and footwear materials.

5 Claims, No Drawings

FIBER-REINFORCED RUBBER COMPOSITION AND PRODUCTION PROCESS AND USE THEREOF

This is a divisional of application Ser. No. 07/097,101, filed Sept. 16, 1987 and now U.S. Pat. No. 5,006,603.

BACKGROUND OF THE INVENTION

1. Field of the Invention

The present invention relates to a novel reinforced rubber composition having an excellent productivity, processability, and yet an excellent modulus, strength and crack growth resistance of a vulcanized product thereof, and a process for the production thereof.

The excellent characteristics of the reinforced rubber composition of the present invention enable it to be used for products such as tire inner members, such as the belt, carcass, bead, etc., tire outer members, such as the tread, sidewall, etc., rubber parts for automobiles, industrial products such as belts, hoses, etc., and as footwear materials, etc.

The present invention also relates to a bead filter rubber composition having an excellent processability with a small Mooney viscosity (ML), which can produce a vulcanized product having a good flexural crack growth resistance.

The present invention further relates to a tire for an automobile in which a rubber composition having an excellent processability and a small Mooney viscosity $(ML_{1+4})$ is used for the cap tread rubber.

The present invention still further relates to a rubber crawler which has an improved cut resistance and moldability and by which the weight of an article is reduced.

2. Description of the Related Art

In the prior art, reinforced rubber compositions to be used for respective members of tires have been produced by formulating short fibers of nylon, polyester, vinylon, etc. with a vulcanizable rubber. However, the thus obtained reinforced rubber compositions have greater fiber diameters and no bond between fibers and the rubber. Accordingly, the vulcanized product does not have a sufficient modulus and strength, particularly the modulus and strength at high elongation, and there is a demand for the development of a reinforced rubber composition having a greater modulus and strength.

Accordingly, an elastomer reinforcing process comprising kneading a polymer capable of fiber formation with a rubber and then extruding the kneaded product, and a reinforced elastomer composition, have been proposed (see Japanese Unexamined Patent Publication (Kokai) No. 53-8682). However, according to this process, thick fibers or films of polymers are formed, and because of an absence of bonding between rubber and the polymer (fibers) at the fiber interface, the tensile strength and modulus at a high elongation and the peel-off strength, i.e., adhesive force with other various substrates are low, and thus a reinforced rubber composition usable for the preparation of tire members cannot be obtained.

Japanese Examined Patent Publication (Kokoku) No. 55-41652 discloses a process for the production of a reinforced rubber composition comprising kneading a vulcanizable rubber with powdery 1,2-polybutadiene, extruding the kneaded product, and then rolling the extrudate with rolls. The reinforced rubber composition according to this process, although the vulcanized product thereof exhibits high modulus, high elongation, high strength, and high peel-off strength, has a low strength of the fibers formed from 1,2-polybutadiene and, therefore, during rubber processing, particularly during kneading with carbon black, fibers are cut and the fiber lengths shortened, and thus a drawback arises in that the stress at low elongation of the vulcanized product is small.

Accordingly, to improve the drawbacks of the reinforced rubber compositions known in the art, the present inventors have proposed a process for the production of a reinforced rubber composition comprising melt extruding a composition containing a block copolymer of liquid diene type rubber and nylon formulated in a vulcanizable rubber to form nylon into fibers, and at the same time, graft the vulcanizable rubber to the liquid diene type rubber (Japanese Unexamined Patent Publication (Kokai) No. 58-19342). However, this production process does not have a good reproducibility of the block polymerization and has a high cost, and thus problems arise in the practical application thereof.

Further, the present inventors, to obviate these drawbacks, proposed a reinforced rubber composition including fine polyamide fibers buried in a vulcanizable rubber and having a vulcanizable rubber graft bonded to the fibers at the fiber interface through a precondensate of phenol formaldehyde (Japanese Unexamined Patent Publication (Kokai) No. 60-186550).

However, although this reinforced rubber composition has an excellent productivity, processability and can give a vulcanized product having an excellent modulus, tensile strength and adhesiveness, etc. at a low elongation and high elongation, a drawback arises in that the crack growth resistance is low, and therefore, the uses thereof have been remarkably limited.

EPDM rubber, which is an ethylene-propylene-diene copolymer, has an excellent heat resistance and weathering resistance, and has been utilized widely for rubber products for industrial uses, such as a material for heat resistant rubber hoses, heat resistant rubber belts, rubber vibration isolators, sponge rubbers, etc. When an ordinary EPDM rubber is provided for the production material of the above products, various reinforcing agents are formulated, depending on the kind of product. Examples of such reinforcing agents may include inorganic reinforcing agents such as carbon black, silica, magnesium carbonate, magnesium silicate, and organic reinforcing agents such as phenol-formaldehyde resin, polyamide fiber, aramide fiber, polyester fiber, etc.

The EPDM rubber composition formulated with the above reinforcing agent has an increased green strength in the unvulcanized state, and the vulcanized product exhibits a high modulus, but a large amount of the reinforcing agent must be formulated to increase the effect thereof. However, when a large amount of the above reinforcing agent is formulated, the flowability and roll processability are reduced, and the surface smoothness of the extrudate during extrusion molding is lowered, and therefore, productivity is lowered and the practical value of the product is reduced. Also, among the above organic reinforcing agents, when an organic fiber is used as the reinforcing agent, ordinarily an RFL treatment is applied to the above organic fiber to enhance the adhesiveness or close contact of said organic fiber with EPDM rubber, but an adequate RFL treatment method has not been developed as yet.

For the above reasons, the above reinforcing agent cannot be formulated in a large amount in EPDM rubber, and therefore, the green strength of EPDM rubber cannot be sufficiently increased. Accordingly, in the production steps of rubber products for extrusion, a cumbersome step of semi-vulcanization is incorporated in the course thereof, a mandrel to prevent mold deformation is inserted, or special vulcanization equipment is required, and thus the steps become complicated and cause an increase in costs.

Also, due to the absence of an adequate RFL treatment method, the interfacial bond between organic fiber and EPDM rubber is weak, and in the tensile test of the vulcanized product, voids are generated in the vicinity of the interface of the above organic fiber in the elongation process, with the result that the tensile strength is lowered and elongation at break is reduced.

Also, in an EPDM composition formulated with an inorganic reinforcing agent with a low reinforcing effect, such as silica, magnesium carbonate, magnesium silicate, calcium carbonate, clay, alumina, etc., because of a low green strength, special techniques and equipment are required for the production of hollow products or extruded products having complicated cross-sectional shapes, whereby the shape of the products is limited.

Further, as a method for enhancing the green strength of the EPDM rubber composition, it has been known to formulate an EPDM rubber with higher ethylene content, but the above green strength can be increased at most two-fold by formulation of said EPDM rubber. Also, as a result of this, the properties may be degraded, such as, for example, freeze resistance may be lowered due the crystallization of an ethylene component and the crack growth resistance may be lowered, although the reasons for this are not yet clear.

Further, as shown in (i) to (vi) given below, various rubber compositions and resin compositions have been known in the art, but they are deficient in productivity and processability, and do not have the good mechanical properties of vulcanized products and molded products.

(i) Japanese Unexamined Patent Publication (Kokai) No. 60-139729 discloses a composition containing the following components, a tackifier, a vulcanizable synthetic rubber, a thermoplastic rubber having an amide group, a novolac type phenol resin, and a formaldehyde donor. This composition, as is apparent specifically from Example 13 in the above published specification, comprises a tackifier, EPDM, 6-nylon short fibers, a novolac type phenol resin and hexamethylenetetramine as the essential components, and the above EPDM and the above 6-nylon short fibers are grafted through the novolac type phenol resin.

(ii) Japanese Unexamined Patent Publication (Kokai) No. 61-120855 discloses a composition comprising essential components of a polyphenylene ether, a polyamide and a silane derivative. In this resin composition, although the graft reaction product of the polyphenylene ether and polyamide through the silane derivative may be estimated to exist, neither the polyphenylene ether nor the polyamide are in the form of short fibers, and no chemical bond exists between the rubbery high molecular weight polymer of 50% by weight or less contained in the resin composition and the polyphenylene ether or the polyamide.

(iii) Japanese Unexamined Patent Publication (Kokai) No. 49-104992 discloses an adduct obtained by heating a mixture of an ethylene-α-olefin-non-conjugated diene copolymer and maleic anhydride.

(iv) Japanese Unexamined Patent Publication (Kokai) No. 51-143061 discloses a poly-phase thermoplastic composition having fine specific polymers dispersed in a matrix of a polyamide.

(v) Japanese Unexamined Patent Publication (Kokai) No. 54-63150 and Japanese Unexamined Patent Publication (Kokai) No. 54-63151 disclose a polyamide type resin composition comprising essential components of a polyamide type resin, an epoxy modified olefin polymer, and a lubricant.

(vi) Japanese Unexamined Patent Publication (Kokai) No. 60-63242 discloses a composition of EPDM and a thermoplastic resin having an aromatic vinyl monomer grafted onto EPDM.

Further as shown in (vii) to (ix) below, various rubber compositions have been known in the art, but these cannot satisfy the required strength and form maintenance characteristic in the unvulcanized state and the physical properties of the vulcanized products such as the modulus, etc.

(vii) Japanese Unexamined Patent Publication (Kokai) No. 55-59950 discloses, for an improvement of the adhesiveness of fibers subjected to RFL treatment and an EPDM rubber composition, a rubber composition in which a methylene group generating agent (methylene donor) is formulated in a mixture of said fibers with said EPDM composition.

(viii) Japanese Unexamined Patent Publication (Kokai) No. 58-56837 discloses, for cancelling weld defects generated during extrusion molding or injection molding of a rubber, a rubber composition in which a methylene acceptor and a methylene donor are formulated in a rubber.

(ix) Japanese Unexamined Patent Publication (Kokai) No. 60-139729 discloses a composition containing essential components of a tackifier, a vulcanizable synthetic rubber, a thermoplastic rubber having an amide group, a novolac type phenol resin, and a formaldehyde donor.

As described above, to prepare a rubber composition with an enhanced form maintenance characteristic of the unvulcanized product and high modulus of the vulcanized product, a large amount of reinforcing agent must be formulated, but formulation of a large amount of reinforcing agent will reduce the flowability and remarkable worsen the processability during rolling and extrusion molding. Moreover, the vulcanized product formulated with a large amount of a reinforcing agent, although exhibiting a high modulus, will generally have a reduced tensile strength.

Recently, as more high-speed roads such as highways are built, a greater high speed durability is demanded of tires. Tires become more susceptible to a standing wave phenomenon as they are run at higher speeds, which may lead to punctures of the tires, as is well known. As one effective approach to an inhibition of the standing wave phenomenon, an improvement of the rigidity at the bead portion has been considered. Also, since a higher modulus of the bead portion also has an effect of reducing the rolling resistance, the bead filler rubber preferably has a high modulus.

On the other hand, once the standing wave phenomenon is generated, the bead portion is greatly deformed and, therefore, from the standpoint of safety, the bead filler rubber must have a good crack growth resistance so that tire punctures are not immediately caused. Thus, as conditions necessary for the bead filler rubber to bring an improvement of the high speed durability of a tire, a high modulus and good crack growth resistance are necessary.

Various methods have been proposed for obtaining a rubber with a high modulus, but these all have their respective problems. The method in which carbon black is formulated in a large amount is not preferable because the rubber cannot be well cohered during the processing steps, the power load is increased during banbury mixer kneading, and difficulties are encountered in tire molding working due to an increased ML of the formulation. The method in which sulfur is formulated in a large amount poses the problems of a blooming of sulfur, a remarkable reduction in physical properties such as flexural crack growth due to an increased crosslinking density, etc. Also, the method of adding a thermosetting resin, which is one method of imparting a high modulus, is subject to severe restrictions in the preparation conditions thereof, such as a prolonged kneading time for obtaining a good dispersion of a thermosetting resin, which is required because of the low compatibility of a large amount of a thermosetting resin with natural rubber or diene type rubber, etc. Also, a kneaded batch formulated with a large amount of a thermosetting resin is relatively hard even when not vulcanized, and therefore, loading becomes greater or the molding workability is reduced during kneading and extrusion. Also, the method of merely formulating short fibers poses the problems of an increased creep or lower fatigue life due to an insufficient bonding between the short fibers and the rubber.

Generally speaking, tires must have an excellent drivability and durability, etc., particularly an excellent wet skid resistance on wet road surfaces from the aspect of safety. Also, based on social demands for a conservation of resources in recent years, to effect a reduction in dynamic loss in tires, tires with a small rotatory resistance, namely with a small energy loss, have been researched and developed. Although the energy loss consumed in freely rotating tires may vary, depending on the structure of the tire, about ½ of the total energy is consumed at the tread portion. Accordingly, if the internal consumption in the tread rubber can be reduced, the energy loss during rotation of a tire can be reduced to produce a tire with a low rotational resistance.

Accordingly, attempts have been made to modify the tread rubber to obtain a lower energy loss. However, such a modification of the rubber tends to lower the wet skid resistance. Since an improvement of the rotatory resistance and an improvement of wet skid resistance are antagonistic to each other, various improvements and contrivances have been made to make these matters compatible with each other. One contrivance is to form the tread from two layers of a cap tread and a paste tread. That is, by forming a tire with two layers of a cap tread with a good wet skid resistance and a paste tread with a small energy loss, the wet skid resistance of the tire as a whole is lowered, and the energy loss is also lowered.

As the rubber for the cap tread, in addition to the wet skid resistance and abrasion resistance, a high modulus for a high speed running performance as well as a low viscosity capable of an easy flow even to corners of a complicated tread pattern of a mold are required.

Various methods have been attempted for obtaining a rubber with a high modulus, but all have their problems. The method in which carbon black is formulated in a large amount is not preferable because the rubber cannot be well cohered during the processing steps, the power load is increased during banbury mixer kneading, and difficulties are encountered in tire molding working due to an increased ML of the formulation. The method in which sulfur is formulated in a large amount poses the problems of a blooming of sulfur, and a remarkable reduction in physical properties such as flexural crack growth due to an increased crosslinking density, etc. Also, the method of adding a thermosetting resin, which is one method of imparting a high modulus, is subject to severe restrictions in the preparation conditions thereof, such as a prolonged kneading time for obtaining a good dispersion of a thermosetting resin, which is required because of the low compatibility of a large amount of a thermosetting resin with natural rubber or diene type rubber, etc. Also, a kneaded batch formulated with a large amount of a thermosetting resin is relatively hard even when not vulcanized, and therefore, loading becomes greater or the molding workability is reduced during kneading and extrusion. Also, the method of merely formulating short fibers poses the problems of an increased creep or lower fatigue life due to an insufficient bonding between short fibers and the rubber.

The performances demanded of rubber crawlers running primarily on non-level ground surfaces, such as for vehicles for construction, farm tractors, combat tanks, snow mobiles, etc., are; a resistance to defects or damage of the elastic tread rubber material caused by contact with projections from the ground, and an abrasion resistance.

Although various attempts have been made to improve the cut resistance and abrasion resistance of rubber materials for a rubber crawler, these proved to be unsatisfactory because any improvement of the cut resistance or abrasion resistance (evaluated by picoabrasion) was unsatisfactory, and resulted in an increased Mooney viscosity of the rubber composition or the need for a more complicated molding method, thus reducing the moldability of the rubber materials.

More specifically, even if a rubber composition with an increased amount of carbon black formulated therein is used to improve the cut resistance and abrasion resistance of rubber materials, the cut resistance and abrasion resistance can be improved only a little, and drawbacks arise, such as the Mooney viscosity of the composition becomes higher and the weight of the product is increased. On the contrary, when a rubber composition with a decreased amount of carbon black is used, a drawback arises in that the cut resistance and abrasion resistance are reduced.

On the other hand, the method of adding 5 to 30 PHR of nylon cut fibers to a rubber may improve the durability to some extent, compared with the rubber without the added fiber, but the cut fibers must be oriented vertically to the contact ground surface, probably because cut fibers not bonded with rubber are used, and therefore, the moldability is very bad.

SUMMARY OF THE INVENTION

Accordingly, the objects of the present invention are to eliminate the above-mentioned disadvantages of the prior art, especially, a low productivity and crack growth resistance, and to provide a reinforced rubber composition having an excellent productivity, processability, and an excellent modulus and tensile strength at a low elongation and high elongation, particularly the crack growth resistance, of a vulcanized product, and a process for the production thereof.

Another object of the present invention is to provide a rubber composition having a high strength and high form maintenance characteristic in the unvulcanized state and having a high modulus of the vulcanized product.

A further object of the present invention is to provide a bead filler rubber composition having an excellent productivity, processability, and capable of providing a vulcanized product with a high modulus and good flexural crack growth resistance.

A still further object of the present invention is to provide a tire for an automobile having an excellent moldability and a good high speed running performance, wet road gripping characteristic and abrasion resistance, by formulation of a special rubber composition.

A still further object of the present invention is to provide a rubber crawler having an excellent moldability and good durability.

Other objects and advantages of the present invention will be apparent from the following description.

In accordance with the present invention, there is provided a reinforced rubber composition comprising 100 parts by weight of a vulcanizable rubber including 1 to 100 parts by weight of fine short fibers of a fiber forming polyamide buried therein, and said polyamide and said rubber being bonded through a silane coupling agent.

In accordance with the present invention, there is also provided a process for producing a reinforced rubber composition comprising the steps of kneading, a vulcanizable rubber, a fiber-forming polyamide and 0.1 to 5.5 parts by weight of a silane coupling agent per 100 parts by weight of said polyamide at a temperature not less than the melting point of said polyamide; and extruding the resultant kneaded product at a temperature not less than the melting point of said polyamide.

In accordance with the present invention, there is further provided a reinforced rubber composition comprising 100 parts by weight of an ethylene-propylene-diene copolymer rubber including 2 to 100 parts by weight of fine short fibers of a fiber-forming thermoplastic polyamide buried therein, and said polyamide and said copolymer being bonded through 0.2 to 5 parts by weight (the amount based on 100 parts by weight of the total amount of said copolymer rubber and said polyamide) of a coupling agent at the interface of said short fibers.

In accordance with the present invention, there is further provided a rubber composition having high form maintenance characteristic in the unvulcanized state and also high modulus of the vulcanized product, comprising a reinforced rubber composition (A) comprising fine short fibers of a fiber forming thermoplastic polyamide dispersed in a continuous phase comprising an ethylene-propylene-diene copolymer rubber, said polyamide and said copolymer rubber being bonded at the interfaces of said short fibers through a novolac type phenol resin or a coupling agent, the amount of said polyamide being 2 to 70 parts by weight per 100 parts of said copolymer rubber, and a methylene acceptor (B) and a methylene donor (C) formulated in said reinforced rubber composition each in an amount of 0.1 to 10 parts by weight per 100 parts by weight of said copolymer rubber.

In accordance with the present invention, there is still further provided a bead filler rubber composition comprising a formulation of a reinforced rubber composition (A) comprising 100 parts by weight of a vulcanizable rubber including to 100 parts by weight of fine short fibers of a fiber-forming polyamide buried therein, and said polyamide and said rubber being bonded through a silane coupling agent, a diene type rubber (B) and carbon black (C), and also satisfying the conditions (I) to (IV) shown below:

(I) the amount of said polyamide is 2 to 20 parts by weight per 100 parts by weight of the total rubber component;

(II) at least natural rubber and/or polyisoprene is used as the rubber component, with the proportion of the total amount of said natural rubber and/or polyisoprene being 55 to 100% by weight based on the total rubber component;

(III) the amount of the carbon black is 50 to 70 parts by weight based on 100 parts by weight of the total rubber component; and (IV) the vulcanized product obtained has a 50% modulus of 30 kg/cm$^2$ or more.

In accordance with the present invention, there is still further provided a tire for an automobile, which comprises using a rubber composition comprising a formulation of a reinforced rubber composition (A) comprising a vulcanizable rubber including fine short fibers of a fiber-forming polyamide buried therein, and said polyamide and said rubber being bonded through a silane coupling agent, a diene type rubber (B) and carbon black (C), and also satisfying the conditions (I) to (IV) shown below, for the cap tread portion:

(I) the amount of said polyamide is 1 to 15 parts by weight per 100 parts by weight of the total rubber component;

(II) the proportion of natural rubber and/or polyisoprene is to 40% by weight based on the total rubber components in the component (A) and the component (B);

(III) the amount of the carbon black is 60 to 90 parts by weight based on 100 parts by weight of the total rubber component; and (IV) the vulcanized product obtained has a 300% modulus of 100 kg/cm$^2$ or more.

In accordance with the present invention, there is still further provided a rubber crawler, which comprises using a rubber composition comprising a formulation of a reinforced rubber composition (A) comprising a vulcanizable rubber including fine short fibers of a fiber-forming polyamide buried therein, and said polyamide and said rubber being bonded through a silane coupling agent, a diene type rubber (B) and carbon black (C), and also satisfying the conditions (I) to (IV) shown below, as the rubber material:

(I) the amount of said polyamide is 1 to 20 parts by weight per 100 parts by weight of the total rubber component;

(II) the proportion of natural rubber and/or polyisoprene is 60 to 100% by weight based on the total rubber components in the component (A) and the component (B);

(III) the amount of the carbon black is 30 to 60 parts by weight based on 100 parts by weight of the total rubber component; and (IV) the vulcanized product obtained has a hardness of 55° to 75° as measured by a JIS K6301 type spring system hardness test.

DESCRIPTION OF THE PREFERRED EMBODIMENT

The vulcanizable rubbers usable in the present invention are all rubbers capable of producing rubber elastomers by vulcanization, including, for example, natural rubber, cis-1,4-polybutadiene, polyisoprene, polychloroprene, styrene-butadiene copolymer rubber, isoprene-isobutylene copolymer, ethylene-propylene-non-conjugated diene terpolymer, and mixtures thereof.

Among these rubbers, natural rubber, polyisoprene, isoprene-isobutylene copolymer, which is substantially free from gelation during melting and kneading of a mixture of a vulcanizable rubber, a polyamide and a silane coupling agent and subsequent extrusion of the kneaded product, is particularly preferred.

Examples of the fiber-forming polyamide usable in the present invention include nylon 6, nylon 6/66, nylon 6/10, nylon 12, nylon 6/11, nylon 6/12, nylon 66, and the like, having melting points of 150° to 260° C., preferably 180° to 235° C.

Also, the polyamide is not particularly limited so long as it has a fiber forming ability, but preferably has a number average molecular weight of 5,000 or more, preferably 8,000 or more. If the molecular weight is too low, the fiber forming ability is poor and the strength is also low.

In the reinforced rubber composition of the present invention, the proportion of fine short fibers of the polyamide buried in the vulcanizable rubber may be 1 to 100 parts by weight, preferably 1 to 70 parts by weight, particularly preferably 30 to 70 parts by weight, per 100 parts by weight of the vulcanizable rubber. If the proportion of the fiber buried in the vulcanizable rubber is less than the above lower limit, the strength and modulus of the vulcanized product cannot be improved, and if the proportion of fibers buried in the vulcanizable rubber is higher than the above upper limit, the crack growth resistance is reduced.

Also, the fine short fibers of polyamide have an average diameter of 0.05 to 0.8 $\mu$m, with the shortest fiber length of the circular cross-section being preferably 1 $\mu$m or longer, and are buried in the vulcanizable rubber in the form of fine short fibers with the molecules being arranged in the fiber axial direction, e.g., in the form wherein the fiber length is 10 $\mu$m or more and 90% by weight or more of the fibers are in the form of 1000 $\mu$m or less in length.

Further, at the interface of the above fiber, polyamide and vulcanizable rubber are bonded through a silane coupling agent.

The silane coupling agents usable in the present invention are those represented by the formula $Y-R_1-SiX_3$ or $Y-R_1SiR_2X_2$, wherein Y, $R_1$, $R_2$, and X represent the following groups, respectively.

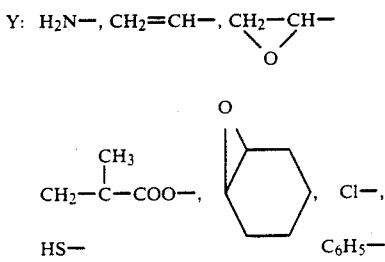

$$R_1: A_pC_nH_{2n}B_qC_mH_{2m}B_qC_lH_{2l}$$
A: $C_6H_4$    P = 0-2
            n = 0-5
B: O, NH    Q = 0-2
            m = 0-5
            l = 0-5
$R_2$: $C_nH_{2n+1}$    n = 1-4
X: $D_rC_nH_{2n}E_sC_mH_{2m+1}$
D: O, Cl    r = 0-2
            n = 0-5
E: O    s = 1-2
            m = 1-5

Specifically, there can be preferably employed $\gamma$-aminopropyltrimethoxysilane, $\gamma$-aminopropyltriethoxysilane, N-$\beta$(aminoethyl)$\gamma$-aminopropyltrimethoxysilane, N-$\beta$(aminoethyl)$\gamma$-aminopropylmethyldimethoxysilane, $\gamma$-(diethylenetriamino)propyltrimethoxysilane, $\gamma$-ureidopropyltriethoxysilane, vinyltriethoxysilane, vinyltrimethoxysilane, vinyltris($\beta$-methoxyethoxy)silane, $\gamma$-glycidoxypropylmethyldiethoxysilane, $\gamma$-glycidoxypropyltrimethoxysilane, $\beta$-(3,4-epoxycyclohexyl)ethyltrimethoxysilane, $\gamma$-methaoryloxypropyltrimethoxysilane, $\gamma$-chloropropyltrimethoxysilane, $\gamma$-mercaptopropyltrimethoxysilane, N-phenyl-$\gamma$-aminopropyltriethoxysilane, N-$\beta$-(N-vinylbenzylaminoethyl)-$\gamma$-aminopropyltrimethoxysilane hydrochloride, etc.

The amount of the silane coupling agent to be used in the present invention may be 0.1 to 5.5 parts by weight, preferably 0.2 to parts by weight, per 100 parts by weight of the polyamide capable of fiber formation.

If the amount of the above coupling agent is less than the above lower limit, the reaction between the vulcanizable rubber and the above polyamide through the silane coupling agent will occur only with difficulty, whereby thick fibers or films of the polyamide may be formed, and further, the bonding between the polyamide and the rubber at the fiber interface will be weak and, therefore, the strength, crack growth resistance, etc. of the vulcanized product obtained by vulcanization of the reinforced rubber composition will be lowered. On the other hand, if the amount of the silane coupling agent is more than the above upper limit, gelation of the vulcanizable rubber will be caused by the silane coupling agent, to prevent fiber formation of the polyamide, whereby the reinforcement and modulus of the vulcanized product will be lowered.

According to the first aspect of the present invention, the composition of the present invention may be produced by kneading a vulcanizable rubber, a polyamide capable of fiber formation, and 0.1 to 5.5 parts by weight of a silane coupling agent per 100 parts by weight of the above polyamide at a temperature not lower than the melting point of the above polyamide, and extruding the kneaded product at a temperature not lower than the above polyamide, or optionally, stretching the extrudate at a temperature higher than the melting point of the polyamide or stretching at a temperature lower than the melting point, or by combining these stretchings.

According to the process for producing the reinforced rubber composition in the present invention, predetermined amounts of a vulcanizable rubber, a polyamide and a silane coupling agent are dry blended, melted and kneaded at a temperature not less than the melting point of the polyamide, whereby a kneaded product comprising 100 parts by weight of a vulcanizable rubber, 1 to 100 parts by weight of a polyamide and 0.1 to 5.5 parts by weight, per 100 parts by weight of the polyamide, of a silane coupling agent can be obtained. Also, by melting and pre-kneading a vulcanizable rubber or a polyamide with a silane coupling agent, and then adding a polyamide or a vulcanizable rubber, respectively, to the resultant pre-kneaded product, melting and kneading them at a temperature not less than the melting point of the polyamide, a kneaded product comprising 100 parts by weight of a vulcanizable rubber, 1 to 100 parts by weight of a polyamide and 0.1 to 5.5 parts by weight, per 100 parts by weight of the polyamide, of a silane coupling agent can be obtained.

Also, using the above kneaded product as a master, by adding a polyamide or a vulcanizable rubber to the resultant kneaded product, a kneaded product comprising 100 parts by weight of a vulcanizable rubber, 1 to 100 parts by weight of a polyamide and 0.1 to 5.5 parts by weight, per 100 parts by weight of the polyamide, of a silane coupling agent can be obtained.

The above respective components may be kneaded by a brabender plastograph, a banbury mixer, rolls, an extruder, etc., preferably for 1 to 15 minutes.

In the process of the present invention, to prevent gelation of the vulcanizable rubber during kneading and extrusion of the respective components, the vulcanizable rubber is preferably formulated with an antioxidant having a low volatility, such as N-(3-methacryloyloxy-2-hydroxypropyl)-N'-phenyl-p-phenylenediamine, phenyl-α-naphthylamine, phenyl-β-naphthylamine, N,N'-diphenyl-p-phenylenediamine, N-isopropyl-N'-phenyl-p-phenylenediamine, N-cyclohexyl-N'-phenyl-p-phenylenediamine, 2,6-di-tert-butyl-4-methylphenol, 2,6-di-tert-butyl-α-dimethylamino-p-cresol, 2,2'-dihydroxy-3,3'-bis(α-methylcyclohexyl)-5,5'-dimethyldiphenylmethane, etc.

Thereafter, by melt extruding the kneaded product at a temperature not lower than the melting point of the polyamide, preferably higher by 5° C. or more than the melting point, and not higher than 300° C., or stretching optionally at a temperature higher than the melting point of the polyamide or stretching at a temperature lower than the melting point, or by combining these stretchings, a reinforced rubber composition can be obtained. During this operation, production of the kneaded product, melt extrusion and stretching can be conducted in one step.

More specifically, through a die in which the shape of the discharging nozzle is circular or rectangular, for example, a circular die or rectangular die, the kneaded product can be extruded into a strand shape (or a sheet shape). When employing a circular die, the inner diameter of the discharging nozzle is preferably 0.1 to 5 mm, and the ratio of the length to the inner diameter of the discharging nozzle (L/D) is 1 to 20. When employing a rectangular die, the slit gap is preferably 0.1 to 5 mm, the width 0.2 to 200 mm, and the length of the die land 10 to 20 mm.

Among the various dies mentioned above, a circular die is preferably used. As the circular die, those having one discharging nozzle or those having a number of discharging nozzles (multi-holded type) can be used.

In extruding the kneaded product, it is preferable to use a known extruder, for example, a screw type extruder, and extrude the kneaded product by setting the temperature at the screw tip portion at a temperature not lower than the melting point of the above polyamide and not higher than 300° C., and the temperature of the die at a temperature not lower than the melting point of the above polyamide and not higher than 300° C., particularly, higher by 5° C. or more than the melting point of the above polyamide and not higher than 280° C.

In the process of the present invention, by extruding the kneaded product as described above, the polyamide in the vulcanizable rubber of the extrudate obtained takes a fibrous form and yet, at the interface of the fibrous polyamide, the polyamide and the vulcanizable rubber are bonded through the silane coupling agent.

The reinforced rubber composition of the present invention can be also obtained by stretching the above extrudate at a temperature not lower than the polyamide, preferably continuously while applying tension at a wind-up speed of 1 to 100 m/min, preferably 20 to 40 m/min. on a wind-up machine (stretching machine) such as a bobbin or wind-up roll, etc. according to the method known per se, cooling the stretched product by air cooling, water cooling, cooling with an inert organic solvent for the rubber and the polyamide such as cooled methanol or elongation of the distance from the die to the wind-up machine (also called stretching machine), and then stretching at a temperature not higher than the melting point of the polyamide by a pair of rolling rolls or effecting monoaxial stretching by stretching rolls. The temperature of the wind-up machine (stretching machine) when winding up the extrudate is preferably 0° to 100° C. When the extrudate comes into contact with the surface of the wind-up machine (stretching machine), a part of the fibrous polyamide becomes flat (a film shape in an extreme case), and thus sometimes a good reinforced rubber composition cannot be obtained. The temperature for stretching with the above rolling rolls is preferably 0° to 100° C. Also, stretching with stretching rolls is preferably practiced at a stretching ratio of 1.1 to 10.

In the process of the present invention, by stretching the extrudate at a temperature higher than or lower than the melting point of the polyamide or by combining these stretchings, the polyamide in the vulcanizable rubber of the reinforced rubber composition obtained is subjected to molecular orientation of the fiber to be converted to a fibrous structure, and these become fine short fibers with great strength.

The reinforced rubber composition obtained according to the process of the present invention contains 1 to 100 parts by weight of a polyamide capable of fiber formation, per 100 parts by weight of a vulcanizable rubber, said polyamide being fine short fibers, and yet the polyamide and the vulcanizable rubber are bonded at the interface of said fiber through a silane coupling agent. By using this composition alone or as a blend with a vulcanizable rubber, a vulcanized product having an excellent modulus, tensile strength, crack growth resistance at low elongation and high elongation can be obtained.

Also, in the reinforced rubber composition of the present invention, preferably the polyamide forming fibers are bonded to the vulcanizable rubber through a coupling agent so that the bound rubber content in terms of the proportion of the weight of the vulcanizable rubber bonded to the polyamide through a silane coupling agent at the interface of fibers relative to the weight of the fine short fibers buried in the vulcanizable rubber (bonded vulcanizable rubber/fine short fibers of polyamide) is 10 to 30 wt. %, particularly 15 to 30 wt. %.

The excellent characteristics of the reinforced rubber composition of the present invention enable it to be used for tire inner members, such as the belt, carcass, bead, etc., tire outer members, such as the tread, sidewall, etc., and industrial products such as belts and hoses, footwears, etc.

The composition of the present invention has fine short fibers of a polyamide buried in a vulcanizable rubber, with the vulcanizable rubber and the polyamide being bonded through a silane coupling agent. This composition has an excellent productivity and processability and provides a novel reinforced rubber composition which can produce a vulcanized product having an excellent strength, modulus, and crack growth resistance.

According to the second aspect of the present invention, a reinforced EPDM rubber composition is provided. That is, there is provided a reinforced rubber composition comprising 100 parts by weight of an ethylene-propylene-diene copolymer rubber including 2 to 100 parts by weight of fine short fibers of a fiber-forming thermoplastic polyamide buried therein, and said polyamide and said copolymer being bonded through 0.2 to 5 parts by weight (the amount based on 100 parts by weight of the total amount of said copolymer rubber and said polyamide) of a coupling agent at the interfaces of said short fibers.

The reinforced rubber composition, as compared with conventional EPDM compositions formulated with organic fiber reinforcing agents, has an excellent surface smoothness during extrusion molding, and has a great green strength, which may be considered to be a measure of form characteristics, and therefore, it becomes possible to formulate a large amount of softening agents, plasticizers and fillers. Thus, it can be said to be a composition having an excellent productivity, processability, and low cost.

Also, the vulcanized product of the reinforced composition of the present invention has a modulus, for example, a modulus $M_{100}$ at 100% elongation, which is equal to that of a conventional EPDM composition formulated with an organic fiber reinforcing agent, and exhibits a value greater than an EPDM composition formulated with an inorganic reinforcing agent.

Further, the vulcanized product of the reinforced rubber composition of the present invention exhibits a tensile strength, which is greater than that of a conventional EPDM composition formulated with an organic fiber reinforcing agent, and equal to or greater than the EPDM composition formulated with an inorganic filler with a high reinforcing ability, for example, carbon black.

Therefore, the vulcanized product of the reinforced rubber composition of the present invention can be said to have well balanced and excellent characteristics with respect to mechanical properties.

The ethylene-propylene-diene copolymer rubber (hereinafter referred to as EPDM rubber) should preferably have a Mooney viscosity ($ML_{1+4}$, 100° C.) of 5 to 80, an iodine value of 4 to 30, and a molar ratio of ethylene units to propylene units within the range from 50/50 to 80/20.

The proportion of the above short fibers buried in the above EPDM is 2 to 100 parts by weight, preferably 3 to 80 parts by weight, based on 100 parts by weight of the above EPDM rubber. If less than 2 parts by weight, the green strength and modulus of the vulcanized product will be reduced, and at a level in excess of 100 parts by weight, the processability will be reduced.

On the other hand, the coupling agent to be used in the reinforced rubber composition of the present invention is preferably a silane coupling agent, a titanate type coupling agent, an unsaturated carboxylic acid or a mixture thereof.

As the silane coupling agent, the above-mentioned examples of the silane coupling agent may be preferably used. Particularly the silane coupling agents having amino group, mercapto group, vinyl group are preferably used.

As the titanate type coupling agent, there may be included, for example, isopropyltriisostearoyl titanate, isopropyltri(N-aminoethyl-aminoethyl)titanate, tetra(2,2-diallyloxymethyl-1-butyl)bis(ditridecyl)phosphite titanate, bis(dioctylpyrophosphate)oxyacetate titanate, isopropyltrioctanoyl titanate, isopropyldimethacrylisostearoyl titanate, isopropylisostearoyldiacryl titanate, etc. and among these, titanate type coupling agents having amino group, vinyl group are preferably used.

As the unsaturated carboxylic acid coupling agent, α,β-unsaturated carboxylic acids, alicyclic unsaturated carboxylic acids, alkenylcarboxylic acids, and derivatives of these, such as acrylic acid, methacrylic acid, maleic acid, fumaric acid, itaconic acid, vinylbenzoic acid, vinylphthalic acid, maleic anhydride, itaconic anhydride, endo-bicyclo(2,2,1)-5-heptene-2,3-carboxylic acid, cis-4-cyclohexene-1,2-carboxylic acid, octadecenylsuccinic acid, and derivatives such as anhydrides, esters, metal salts, etc. thereof. Among these, maleic acid, fumaric acid, itaconic acid, vinylbenzoic acid, vinylphthalic acid, maleic anhydride, itaconic anhydride are preferably used.

The amount of the above-mentioned coupling agent may be 0.2 to 5 parts by weight, preferably 0.3 to 3 parts by weight based on 100 parts by weight of the total amount of the above EPDM rubber and the above polyamide. Although it may depend on the coupling agent used, if the amount of the coupling agent used is less than the above range, the number of bonds, namely the bound rubber content of the above EPDM rubber and the above polyamide becomes smaller, and the diameters of the polyamide short fibers become thicker. On the other hand, if it is more than the above range, the fiber length of the polyamide short fibers becomes shorter, whereby the reinforcing effect of the rubber formulated product is reduced.

Also, in the reinforced rubber composition according to the second aspect of the present invention, preferably the above-mentioned polyamide forming the fibers and the EPDM rubber is bonded through a coupling agent so that the bound rubber content represented by the ratio of the weight of the EPDM rubber bonded to the above polyamide through a coupling agent relative to the weight of the fine short fibers of the above thermoplastic polyamide buried in the above EPDM rubber continuous phase (bonded EPDM rubber/fine short fibers of thermoplastic polyamide) may be 2 to 20% by weight.

Also, in the reinforced rubber composition of the present invention, vulcanizable rubbers, inorganic fillers, softening agents, etc. can be formulated as optional ingredients.

As the above vulcanizable rubber, natural rubber, isoprene rubber, butadiene rubber, styrene-butadiene rubber, nitrile rubber, butyl rubber, etc. may be included, and when these vulcanizable rubbers are formulated, preferably 2 to 100 parts by weight of the above fine short fibers of thermoplastic polyamide is contained, based on 100 parts by weight of of the total amount of the above EPDM rubber and the above vulcanizable rubber.

As the above-mentioned inorganic fillers, carbon black, silicic acid compounds such as anhydrous silicic acid, hydrous silicic acid or synthetic silicates, calcium carbonate, clay, etc. may be included, and the formulation amount is preferably 300 parts by weight or less, based on 100 parts by weight of the above EPDM rubber.

As the above-mentioned softening agent, there may be included mineral oil type softening agents such as paraffinic process oil, naphthenic process oil, aromatic process oil, petroleum resin, polymerized high boiling strong aromatic oil, paraffin, fluid paraffin, white oil, etc.; vegetable oil type softening agents such as cottonseed oil, rapeseed oil, palm oil, rosin, pine tar, etc., factice such as black factice, white factice, etc., fatty acids such as ricinoleic acid, palmitic acid, stearic acid, lauric acid, etc., fatty acid salts such as barium stearate, calcium stearate, zinc stearate, etc.

Also, the reinforced rubber composition of the present invention can incorporate vulcanization agents such as sulfur, sulfur containing compounds, organic peroxides such as dicumyl peroxide, di-tert-butyl peroxide, etc., and organic vulcanization accelerating agents such as aldehydeammonias, aldehydeamines, guanidines, thioureas, thiazoles, thiurams, dithiocarbamates, dithiophosphates, etc.

In the reinforced rubber composition of the present invention, also the formulated composition in which the same kind or different kinds of EPDM rubbers were mixed and formulated, if 2 to 100 parts by weight of the above short fibers of thermoplastic polyamide are buried per 100 parts by weight of the rubber component in the above formulated rubber composition, has a performance equal to the reinforced rubber composition of the present invention, and therefore, such a composition is included within the category of the reinforced composition of the present invention irrespective of the formulation.

The reinforced rubber composition of the present invention as described above can be produced according to the production process of the reinforced rubber composition as described previously, for example, according to the following process, efficiently and in a stable state.

A mixture of 100 parts by weight of the above EPDM rubber, 2 to 100 parts by weight of the above polyamide, 0.2 to 5 parts by weight of the above coupling agent based on 100 parts by weight of the total amount of said EPDM rubber and said polyamide, and parts by weight or less of a tackifier, further optionally added with an antioxidant, is kneaded at a temperature not lower than the melting point of the polyamide by a banbury mixer, rolls or an extruder preferably for 1 to 30 minutes, and the kneaded product obtained is extruded at a temperature not lower than the melting point of the above polyamide preferably not higher than 280° C., followed wind-up of the extrudate, to give the reinforced rubber composition of the present invention.

Also, optional components as described above such as vulcanizable rubber, inorganic filler, and softening agent may be added in the above mixture, as desired.

According to the process of the second aspect of the present invention as described above, with said EPDM rubber as the continuous phase, said polyamide can be dispersed as fine short fibers in said EPDM rubber, and also at the interfaces of said short fibers, said polyamide and said EPDM rubber can be bonded through said coupling agent. In the reinforced rubber composition thus obtained, fine short fibers of said polyamide have circular cross-sections, with an average diameter of 0.05 to 0.8 μm, and are embedded in the above EPDM rubber in the form wherein the fiber is 10 μm or longer, and 90% by weight or more of the fibers are 1,000 μm or less in length.

In the process of the present invention, the coupling agent may be either previously melt blended with the thermoplastic polyamide, attached on the surface of the polyamide, dispersed in the EPDM rubber or added during kneading, or the above methods may be used in combination.

Also, in the process of the present invention, 2 to 50 parts by weight of EPDM rubber may be added to 100 parts by weight of the thermoplastic polyamide and 0.2 to 5 parts by weight of a coupling agent added based on 100 parts by weight of the total amount of the thermoplastic polyamide and EPDM rubber, and the mixture is kneaded at a temperature not lower than the melting point of the above polyamide, followed further by addition of EPDM rubber and the coupling agent, if necessary, and the mixture may be kneaded and extruded at a temperature not lower than the melting point of the above polyamide.

The reinforced rubber composition of the present invention has an excellent productivity and processability, and yet excellent mechanical properties of the vulcanized product.

That is, since the reinforced rubber composition of the present invention has an excellent flowability, roll processability in the unvulcanized state, the surface of the extrudate is smooth, and it has a high green strength and excellent form maintenance characteristic, it has an excellent productivity and processability, and a vulcanized product thereof exhibits, for example, a high modulus with a great strength and elongation as well as tear resistance, and a particularly excellent heat aging resistant characteristic unexpected from the EPDM composition of the prior art.

Also, since the reinforced rubber composition of the present invention has the above properties and a small die swell during extrusion, it can be preferably used for production of rubber extruded articles having complicated shapes, such as radiator hoses, heater hoses for automobiles, heat-resistant felts, heat-resistant hoses, heat-resistant rolls for industrial use, and rubber products exposed to high temperatures.

Also, according to the production process of the present invention, the above reinforced rubber composition of the present invention can be produced efficiently and at a stable quality.

According to the third aspect of the present invention, a rubber composition having a high form maintenance characteristic in the unvulcanized state and a high modulus of the vulcanized product, comprising a reinforced rubber composition (A) comprising fine short fibers of a fiber-forming thermoplastic polyamide dispersed in a continuous phase comprising an ethylene-propylene-diene copolymer rubber, said polyamide and said copolymer rubber being bonded at the interfaces of said short fibers through a novolac type phenol resin or a coupling agent, the amount of said polyamide being 2 to 70 parts by weight per 100 parts of said copolymer rubber, and a methylene acceptor (B) and a methylene donor (C) formulated in said reinforced rubber composition each in an amount of 0.1 to 10 parts by weight per 100 parts by weight of said copolymer rubber.

The green strength of the rubber composition of the present invention, which may be considered to be a measure of the form maintenance characteristic, has a great value of 5-fold or more compared with that of a conventional EPDM used instead of the above reinforced rubber composition (A), and has a great value of about 1.5-fold or more compared with the composition in which a methylene acceptor (B) and methylene donor (C) was not formulated. In other words, it is a composition having an extremely excellent form maintenance characteristics. The rubber composition with such a high form maintenance characteristic can formulate a large amount of plasticizers, etc., and therefore, the rubber composition of the present invention can also contribute to reducing the cost of the product.

Also, the vulcanized product of the rubber composition of the present invention has a large value of 2-fold or more compared with the case when a conventional EPDM is used in place of the above reinforced rubber composition (A), concerning the modulus, for example, stress at a 100% elongation of $M_{100}$.

Further, the tensile strength, of the vulcanized product of the rubber composition of the present invention has a greater value compared with the vulcanized product in which a conventional EPDM and reinforcing agent (carbon black, organic short fibers) is used in place of the above reinforced rubber composition (A), and yet the tensile elongation is also greater.

The rubber composition of the present invention is described in detail as follows.

The reinforced rubber, which is a constituent of the rubber composition of the present invention, can be prepared according to the methods as described below.

The first method comprises kneading a mixture comprising 100 parts by weight of an EPDM rubber, 2 to 100 parts by weight of a thermoplastic polyamide, 20 parts by weight or less of a tackifier, 0.2 to 5 parts by weight of a novolac type phenol resin per 100 parts by weight of the total amount of the above EPDM rubber and the above polyamide and 1 to 50 parts by weight of a methylene donor per 100 parts by weight of said novolac type phenol resin at a temperature not lower than, particularly higher by 5° C. than, the melting point of the above polyamide and not higher than 300° C., by a brabender plastograph, a banbury mixer, rolls, an extruder, etc., for 1 to 30 minutes, and extruding the kneaded product obtained at a temperature not lower than the melting point of the above polyamide and not higher than 300° C., and subsequently winding up the extrudate to obtain the reinforced rubber composition (A) of the present invention.

The second method comprises kneading a mixture comprising 100 parts by weight of an EPDM rubber, 2 to 100 parts by weight of a thermoplastic polyamide, 20 parts by weight or less of a tackifier and 0.2 to 5 parts by weight of a coupling agent per 100 parts by weight of the total amount of the above EPDM rubber and the above polyamide at a temperature not lower than, particularly higher by 5° C. than, the melting point of the above polyamide and not higher than 300° C., by a brabender plastograph, a banbury mixer, rolls, an extruder, etc., for 1 to 30 minutes, and extruding the kneaded product obtained at a temperature not lower than the melting point of the above polyamide and not higher than 300° C., and subsequently winding up the extrudate to obtain the reinforced rubber composition (A) of the present invention.

According to the first method or the second method, the polyamide can be dispersed as fine fibers in the EPDM rubber, with the EPDM rubber being a continuous phase, and a reinforced rubber composition (A) can be produced with the above polyamide and the above EPDM rubber bonded at the interfaces of said short fibers.

The EPDM rubber to be used in the above reinforced rubber composition (A) preferably has a Mooney viscosity ($ML_{1+4}$, 100° C.) of 5 to 80, an iodine value of 4 to 30, a molar ratio of ethylene units to propylene units within the range from 55/45 to 85/15.

The proportion of the above-mentioned short fibers buried in the above EPDM rubber is 2 to 70 parts by weight, preferably 2 to 50 parts by weight, per 100 parts by weight of the above EPDM rubber. If less than 2 parts by weight, the green strength and modulus of the vulcanized product will be reduced, and at a level in excess of 70 parts by weight, and processability will be reduced.

As the above novolac type phenol resin, soluble and fusible resins obtained by condensation reaction between phenols such as phenol, bisphenols, etc. and formaldehyde (which may be also paraformaldehyde) with the use of a catalyst known per se, for example, an acid such as sulfuric acid, hydrochloric acid, phosphoric acid, oxalic acid, etc. and deformants (modified products) thereof, such as novolac type phenol formaldehyde precondensates, novolac type lactam-bisphenol F-formaldehyde precondensates, novolac type styrenated phenol-phenol-formaldehyde precondensates, can be suitably used.

As the coupling agent, silane coupling agent, titanate type coupling agent or a mixture thereof can be used.

As the silane and titanate coupling agent, the above-mentioned examples may be preferably used. Particularly silane coupling agents having amino group, mercapto group, vinyl group and titanate type coupling agents having amino group, vinyl group are preferably used.

In the above reinforced rubber composition (A), preferably the above polyamide forming fibers and EPDM are bonded through a novolac type phenol resin or a coupling agent so that the bound rubber content represented in terms of the ratio of the weight of the EPDM rubber bonded to the thermoplastic polyamide through the novolac type phenol resin or the coupling agent relative to the weight of the fine short fibers of the thermoplastic polyamide dispersed in the EPDM continuous phase (bonded EPDM rubber/fine short fibers of thermoplastic polyamide) is 2 to 20% by weight.

As the methylene acceptor (B), which is a constituent of the rubber composition of the present invention, for example, resorcin, β-naphthol, resol type or novolac type phenol resin precondensates, etc. may be included, and any one thereof can be suitably used.

The amount of the above methylene acceptor formulated may be 0.1 to 10 parts, preferably 0.2 to 5 parts by weight per 100 parts by weight of the above EPDM rubber. If the formulated amount is less than 0.1 part by weight, the green strength and modulus of the vulcanized product will be little improved, and at a level over 10 parts by weight, the processability will be reduced.

As the methylene donor, which is a constituent of the rubber composition of the present invention, hexamethylenetetramine, acetoaldehyde ammonia:

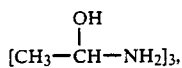

paraformaldehyde, α-polyoxymethylene, polyhydric methylolmelamine derivatives, oxazolildine derivatives, polyhydric methylolated acetyleneurea, etc. may be included, particularly preferably hexamethylenetetramine, hexamethoxymethylmelamine.

The amount of the above methylene donor (C) formulated may be 0.1 to 10 parts by weight, preferably 0.2 to 5 parts by weight, per 100 parts by weight of the above EPDM rubber. If the amount formulated is less than 0.1 part by weight, the increase in the green strength and modulus of the vulcanized product will be small, and processability will be reduced at a level of over 10 parts by weight.

In the rubber composition of the present invention, vulcanizable rubbers can be formulated as an optional component. Examples of such vulcanizable rubbers may include natural rubber, isoprene rubber, butadiene rubber, styrene-butadiene rubber, nitrile rubber, butyl rubber, etc., and when these vulcanizable rubbers are formulated, preferably 2 to 70 parts by weight of the short fibers of the above thermoplastic polyamide are contained per 100 parts by weight of the total amount of the above EPDM rubber and the above vulcanizable rubber.

Also, in the rubber composition of the present invention, inorganic fillers can be formulated as optional components. Examples of such inorganic fillers may include carbon black, silicic acid compounds such as anhydrous silic acid, hydrous silicic acid, calcium carbonate, clay, etc. The amount of the above inorganic filler formulated may be generally 300 parts by weight or less, preferably about 20 to 250 parts by weight per 100 parts by weight of the rubber components in the reinforced rubber composition (A). By formulation of the above inorganic filler, the tensile strength of the vulcanized product can be increased to give preferable results, but rubbery properties will be lost, such as a loss of flexibility, if used in excess of about 300 parts by weight.

Further, in the rubber composition of the present invention, softening agents may be formulated as an optional component. As such softening agents, there may be included mineral oil type softening agents such as paraffinic process oil, naphthenic process oil, aromatic process oil, petroleum resin, polymerized high boiling strong aromatic oil, paraffin, fluid paraffin, white oil, etc.; vegetable oil type softening agents such as cottonseed oil, rapeseed oil, palm oil, rosin, pine tar, etc., factice such as black factice, white factice, etc., fatty acids such as ricinoleic acid, palmitic acid, stearic acid, lauric acid, etc., fatty acid salts such as barium stearate, calcium stearate, zinc stearate, etc. The amount of the above softening agent formulated may be generally 200 parts by weight or less, preferably 150 parts by weight or less per 100 parts by weight of the rubber components in the reinforced rubber composition (A).

The rubber composition of the present invention can be prepared according to the method as described below. This is, predetermined amounts of the reinforced rubber composition (A), the methylene acceptor (B), an inorganic reinforcing agent, a softening agent, a lubricant, etc. as optional components are formulated by a banbury mixer, rolls, etc., and the resultant formulated product formulated with a methylene donor (C), whereby the rubber composition of the present invention can be prepared. Of course, the above formulated ingredients may be mixed at the same time.

The rubber composition of the present invention has an excellent flowability and form maintenance characteristics in the unvulcanized state, and yet has a high modulus of the vulcanized product, compared with compositions of the prior art such as an EPDM composition with a small ethylene content having an excellent freeze resistance or an EPDM composition formulated with an inorganic filler with a low reinforcing ability.

For this reason, the rubber composition of the present invention enables a simplification of the production steps of various rubber products, particularly rubber extruded products having complicated shapes, such as a weather strip with a light color formulation, thus enabling the production of radiator hoses, heater hoses for automobiles, heat-resistant belts, heat-resistant rolls, heat-resistant hoses for industrial uses, etc., having excellent performances.

According to the fourth aspect of the present invention, there is provided a bead filler rubber rubber composition comprising a formulation of a reinforced rubber composition (A) comprising 100 parts by weight of a vulcanizable rubber including 5 to 100 parts by weight of fine short fibers of a polyamide capable of fiber formation buried therein, and said polyamide and said rubber being bonded through a silane coupling agent, a diene type rubber (B) and carbon black (C), and also satisfying the conditions (I) to (IV) shown below:

(I) the amount of said polyamide is 2 to 20 parts by weight per 100 parts by weight of the total rubber component;

(II) at least natural rubber and/or polyisoprene is used as the rubber component, with the proportion of the total amount of said natural rubber and/or polyisoprene being 55 to 100 wt. % based on the total rubber component;

(III) the amount of the carbon black is 50 to 70 parts by weight based on 100 parts by weight of the total rubber component; and (IV) the vulcanized product obtained has a 50% modulus of 30 kg/cm$^2$ or more.

The bead filler rubber composition of the present invention has small Mooney viscosity $ML_{1+4}$ with the vulcanized product having a modulus at 50% (hereinafter sometimes abbreviated as $M_{50}$) of 30 kg/cm$^2$ or more, a flex number by a flexural crack growth resistance test of 1000 times or more, an excellent processability, and the modulus of the vulcanized product is high with a good crack growth resistance, and can be used as the bead filler, which is one of the inner members of a tire, by utilizing these excellent characteristics.

The vulcanizable rubbers, the polyamides, and the silane coupling agents usable in the present invention are those as described above.

The reinforced rubber composition to be used in the present invention includes 5 to 100 parts by weight, preferably 5 to 70 parts by weight, particularly preferably 30 to 70 parts by weight of fine short fibers of the above-mentioned polyamide buried in 100 parts by weight of the above-mentioned vulcanizable rubber, and the above polyamide and the above-mentioned rubber are bonded through a silane coupling agent at the interfaces of said short fibers.

If the proportion of the short fibers buried in the vulcanizable rubber is smaller than the above lower limit, the strength and modulus of the bead filler rubber composition cannot be improved, and if the proportion of the short fibers is more than the above upper limit, the crack growth resistance will be reduced.

Also, preferably the polyamide forming short fibers and the vulcanizable rubber are bonded through a silane coupling agent so that the proportion of the weight of the vulcanizable rubber bonded to the polyamide through the silane coupling agent relative to the weight of fine short fibers of the polyamide (bonded vulcanizable rubber/fine short fibers of polyamide) is 10 to 30% by weight, particularly 15 to 30% by weight.

As described above, in the reinforced rubber composition to be used in the present invention, fine short fibers of a polyamide are buried in a vulcanizable rubber, and said polyamide and vulcanizable rubber are bonded through a silane coupling agent at the interfaces of said short fibers, and therefore, the vulcanized product has a high modulus and flex number and a rubber composition of the present invention with a small $ML_{1+4}$ can be obtained.

The reinforced rubber composition as described above to be used in the present invention may be produced, for example, as follows. A vulcanizable rubber, 5 to 100 parts by weight of a polyamide per 100 parts by weight of said vulcanizable rubber and 0.1 to 5.5 parts by weight of a silane coupling agent per 100 parts by weight of said polyamide are kneaded at a temperature not lower than the melting point of said polyamide, and the resultant kneaded product is extruded at a temperature not lower than the melting point of said polyamide, or further optionally, the above extrudate is stretched at a temperature higher than the melting point of said polyamide or at a temperature lower than the melting point of said polyamide. Further, it can be also obtained by stretching the above extrudate at a temperature higher than the melting point of said polyamide and stretching the above extrudate at a temperature lower than the melting point of said polyamide.

The bead filler rubber composition of the present invention comprises the above reinforced rubber composition (A) formulated with a diene type rubber (B) and carbon black (C).

As the above diene type rubber (B), natural rubber, polyisoprene, cis-1,4-polybutadiene, styrene-butadiene copolymer rubber, isoprene-isobutylene copolymer, etc. may be included.

As the above carbon black, those with particle sizes of 90 mμ or less and dibutyl phthalate (DBP) absorption of 70 ml/100 g or more are preferably used, including various carbon blacks such as HAF, FF, FEF, GPF, SAF, ISAF, SRF, etc.

Also, the bead filler rubber composition is prepared by formulating the respective components so as to satisfy the conditions (I) - (IV) as shown below.

(I) The amount of the above-mentioned polyamide (short fibers) is 2 to 20 parts by weight, preferably 2 to 15 parts by weight, per 100 parts by weight of the total amount of the rubber components, (II) as the rubber component, at least natural rubber and/or polyisoprene is used, with the proportion of the total amount of said natural rubber and/or polyisoprene being 55 to 100% by weight based on the total rubber components, (III) the amount of carbon black is 50 to 70 parts by weight based on 100 parts by weight of the total amount of the rubber components, and (IV) the vulcanized product obtained has a 50% modulus of 30 kg/cm² or more.

If the amount of the above polyamide is smaller than the lower limit of the above range, the ML of the composition is smaller and a rubber composition with a high modulus and flex number of the vulcanized product cannot be obtained, and if the amount of the polyamide is larger than the upper limit of the above range, the $ML_{1+4}$ of the composition becomes large, whereby the processability will be worsened. Also, as the rubber component, at least natural rubber and/or polyisoprene must be used. If the amount formulated thereof falls outside the range as specified above, the flex number of the vulcanized product tends to become smaller. If the amount of carbon black is smaller than the lower limit of the above range, the modulus of the vulcanized product becomes lower, and if it is more than the upper limit of the above range, the ML of the rubber composition becomes larger, whereby the processability will be worsened. Also, if the $M_{50}$ of the vulcanized product is outside of the above range, the modulus of the vulcanized product becomes lower, and is unsuitable for a bead filler rubber composition.

The bead filler rubber composition can be prepared by kneading the above respective components (A), (B) and (C) by means of a kneader such as banbury mixer, rolls, etc., at 50° to 180° C. for about 1 to 60 minutes.

The bead filler rubber composition of the present invention may be formulated with additives such as vulcanization agents, etc.

As the vulcanization agent, known vulcanization agents such as sulfur, organic peroxides, sulfur containing compounds, etc. can be used. The method for formulating the vulcanization agent in the rubber composition is not particularly limited, but formulation methods known per se can be employed.

Also, the bead filler rubber composition of the present invention can be formulated together with vulcanizing agents reinforcing agents such as thermosetting resins, white carbon, activated calcium carbonate, ultrafine magnesium silicate, high styrene resins, coumarone-indene resins, phenol resins, lignin, modified melamine resins, petroleum resins, etc.; fillers such as calcium carbonate of various grades, basic magnesium carbonate, clay, zinc oxide, diatomaceous earth, regenerated rubber, powdery rubber, ebonite powder, etc.; vulcanization accelerators such as aldehyde-ammonias, aldehyde-amines, guanidines, thioureas, thiazoles, thiurams, dithiocarbamates, xanthats, etc.; vulcanization acceleration aids such as metal oxides, fatty acids, etc.; antioxidants such as amine-aldehydes, amine-ketones, amines, phenols, imidazoles, sulfur-containing type or phosphorus-containing type; naphthenic or aromatic process oils, etc., within the range which does not alter the effects of the present invention.

Particularly, in the rubber composition of the present invention, it is preferable to formulate 1 to 30 parts by weight of a thermosetting resin such as a novolac type phenol resin per 100 parts by weight of rubber.

The rubber composition of the present invention has a small Mooney viscosity and, therefore, an excellent processability, and yet has an $M_{50}$ of 30 kg/cm² or higher and a flex number of 1000 times or more, with a high modulus and flexural crack growth resistance, of the vulcanized product, and can be used for tire members of automobiles, buses, trucks, airplanes, etc. as well as for other tire members (e.g. sidewalls, treads, chafers, rims, etc.).

According to the fifth aspect of the present invention, there is provided a tire for an automobile, which comprises using a rubber composition comprising a formulation of a reinforced rubber composition (A) comprising a vulcanizable rubber including fine short fibers of a fiber-forming polyamide buried therein, and said polyamide and said rubber being bonded through a silane coupling agent, a diene type rubber (B) and carbon black (C), and also satisfying the conditions (I) to (IV) shown below, for the cap tread portion:

(I) the amount of said polyamide is 1 to 15 parts by weight per 100 parts by weight of the total rubber component;

(II) the proportion of the total amount of natural rubber and/or polyisoprene is 5 to 40% by weight based on the total rubber components in the component (A) and the component (B);

(III) the amount of the carbon black is 60 to 90 parts by weight based on 100 parts by weight of the total rubber component; and (IV) the vulcanized product obtained has a 300% modulus of 100 kg/cm$^2$ or more.

The rubber composition for cap tread to be used in the present invention, which has an excellent processability and flowability with a small Mooney viscosity $ML_{1+4}$, although having a high modulus, can easily flow even to corners of a complicated tread pattern of a mold, and has a good wet skid resistance and abrasion resistance.

In the present invention, it is necessary to formulate a reinforced rubber composition in which fine short fibers of a polyamide capable of fiber formation are buried in a vulcanizable rubber, and said polyamide and the vulcanizable rubber are bonded through a silane coupling agent at the interfaces of said fibers, whereby a rubber composition with an excellent moldability can be produced although fibers are formulated in the polymer, and by use of the composition for a cap tread, a tire with a good wet road surface gripping characteristic and abrasion resistance can be produced.

The vulcanizable rubbers, the polyamides, and the silane coupling agents usable in the present invention are those as described above.

Also, preferably the polyamide forming short fibers and the vulcanizable rubber are bonded through a silane coupling agent so that the proportion of the vulcanizable rubber based on the weight of fine short fibers of the polyamide (bonded vulcanizable rubber/fine short fibers of polyamide) is 10 to 30% by weight, particularly 15 to 30% by weight.

The reinforced rubber composition as described above to be used in the present invention may be produced, for example, as follows. A vulcanizable rubber, 5 to 100 parts by weight of a polyamide per 100 parts by weight of said vulcanizable rubber and 0.1 to 5.5 parts by weight of a silane coupling agent per 100 parts by weight of said polyamide are kneaded at a temperature not lower than the melting point of said polyamide, and the resultant kneaded product is extruded at a temperature not lower than the melting point of said polyamide, or further optionally, the above extrudate is stretched at a temperature higher than the melting point of said polyamide or at a temperature lower than the melting point of said polyamide. Further, it can be also obtained by using these stretchings in combination.

The rubber composition for a cap tread to be used in the present invention comprises the above reinforced rubber composition (A) formulated with a diene type rubber (B) and carbon black (C).

As the above diene type rubber (B), natural rubber, polyisoprene, cis-1,4-polybutadiene, styrene-butadiene copolymer rubber, isoprene-isobutylene copolymer, etc. may be included.

As the above carbon black, those with particle sizes of 90 mμ or less and a dibutyl phthalate (DBP) absorption of 70 ml/100 g or more are preferably used, including various carbon blacks such as HAF, FF, FEF, GPF, SAF, ISAF, SRF, etc.

Also, the respective components as mentioned above are formulated so as to satisfy the above conditions, namely (I) the amount of the above polyamide (short fibers) is 1 to 15 parts by weight, preferably 2 to 15 parts by weight, per 100 parts by weight of the total amount of the rubber components, (II) as the rubber proportion, the total amount of natural rubber and/or polyisoprene in the component (A) and the component (B) is 5 to 40% by weight, (III) the amount of carbon black is 60 to 90 parts by weight, based on 100 parts by weight of the total amount of the rubber components, and (IV) the vulcanized product obtained has a 300% modulus as defined in JIS K 6301 of 100 kg/cm$^2$ or higher. If the amount of carbon black is smaller than the lower limit of the above range, the modulus of the vulcanized product becomes lower, and conversely, if it is more than the upper limit of the above range, the $ML_{1+4}$ of the rubber composition becomes greater, whereby the tire moldability tends to be worsened. Also, if the proportion of the rubber is outside the above range, picoabrasion or the wet skid resistance of the vulcanized product will be lowered.

The rubber composition to be used in the present invention can be prepared by kneading the above respective components by a kneader such as banbury mixer, rolls, extruder, etc. at 50° to 180° C. for about 1 to 60 minutes. The rubber composition is formulated with additives such as vulcanizing agents as described in the case of the bead filler rubber composition.

The rubber composition for a cap tread of the present invention has an excellent processability, flowability with a small Mooney viscosity $ML_{1+4}$ (100° C.), although having a high modulus, and therefore, can flow easily even to corners of a complicated pattern of a mold to exhibit a good moldability. Also, the wet skid resistance and abrasion resistance are good, and in place of the compositions known in the art, tires with a good wet road surface gripping characteristic and abrasion resistance can be produced for use as a cap tread for automobiles, buses, trucks, airplanes, etc.

According to the sixth aspect of the present invention, there is provided a desired rubber crawler by using a rubber composition comprising a formulation of a reinforced rubber composition (A) comprising a vulcanizable rubber including fine short fibers of a polyamide capable of fiber formation buried therein, and said polyamide and said rubber being bonded through a silane coupling agent, a diene type rubber (B) and carbon black (C), and also satisfying the conditions (I) to (IV) shown below, as the rubber material:

(I) the amount of said polyamide is 1 to 20 parts by weight per 100 parts by weight of the total rubber component;

(II) the proportion of natural rubber and/or polyisoprene is 60 to 100% by weight based on the total rubber components in the component (A) and the component (B);

(III) the amount of the carbon black is 30 to 60 parts by weight based on 100 parts by weight of the total rubber component; and (IV) the vulcanized product obtained has a hardness of 55° to 75° as measured by the JIS K6301 type spring system hardness test.

In the present invention, it is necessary to formulate a reinforced rubber composition in which a vulcanizable rubber forms a continuous phase and fine short fibers of a polyamide capable of fiber formation are dispersed therein and, at the interfaces of said short fibers, the above polyamide and vulcanizable rubber are bonded through a silane coupling agent, and by such formulation, a rubber composition having an excellent moldability can be produced regardless of the formulation of polyamide fibers, and a rubber crawler with an excellent cut resistance can be produced by using the composition as the rubber material for an elastic tread.

The vulcanizable rubbers, the polyamides, and the silane coupling agents usable in the present invention are those as described above.

As the vulcanizable rubber, natural rubber is preferred. When a synthetic rubber is used as the rubber, preferably the rubber is formulated with a tackifier. As the above tackifier, all tackifiers, which are nonreactive or have an extremely low reactivity (namely substantially nonreactive with the synthetic rubber by heating) and imparting tackiness to the synthetic rubber with an excellent compatibility with rubber can be used. For example, there can be included coumarone resins such as coumrone-indene resins, nonreactive phenol-formaldehyde resins such as nonreactive phenol resins, etc., alkylphenol acetylenic resins, terpene-phenol resins, polyterpene resins, petroleum type hydrocarbon resins such as hydrocarbon type tackified resins, polybutene, etc., rosin derivatives such as zinc resinate, and mixtures thereof. The tackifier is preferably formulated at a proportion of 0.5 to 20 parts by weight, particularly 0.5 to 10 parts by weight, based on 100 parts by weight of the rubber.

Also, preferably the polyamide forming short fibers and the vulcanizable rubber are bonded through a silane coupling agent so that the proportion of the weight of the vulcanizable rubber bonded to the polyamide through the silane coupling agent relative to the weight of fine short fibers of the polyamide (bonded vulcanizable rubber/fine short fibers of polyamide) is 10 to 30% by weight, particularly 15 to 30% by weight.

In the present invention, the fine short fibers of a fiber-forming polyamide buried in a vulcanizable rubber in the reinforced rubber composition to be used has great strength, and yet at the interfaces of said fibers, the above polyamide and vulcanizable rubber are bonded through a silane coupling agent, and therefore a rubber composition with a small Mooney viscosity and excellent moldability can be produced, and by use of the composition as the rubber material, a rubber crawler with an excellent cut resistance and abrasion resistance can be produced.

The reinforced rubber composition as described above to be used in the present invention may be produced, for example, as follows. A vulcanizable rubber, 5 to 100 parts by weight of a polyamide per 100 parts by weight of said vulcanizable rubber, 0.1 to 5.5 parts by weight of a silane coupling agent per 100 parts by weight of said polyamide and optionally 0.5 to 20 parts by weight of a tackifier per 100 parts of said vulcanizable rubber are kneaded at a temperature not lower than the melting point of said polyamide, and the resultant kneaded product is extruded at a temperature not lower than the melting point of said polyamide, or further optionally, the above extrudate is stretched at a temperature higher than the melting point of said polyamide or at a temperature lower than the melting point of said polyamide. Further, it can be also obtained by using these stretchings in combination.

The reinforced rubber composition to be used for a rubber crawler in the present invention comprises the above reinforced rubber composition (A) formulated with a diene type rubber (B) and carbon black (C).

As the above diene type rubber (B), natural rubber, polyisoprene, cis-1,4-polybutadiene, styrene-butadiene copolymer rubber, isoprene-isobutylene copolymer, etc. may be included.

As the above carbon black, those with particle sizes of 10 to 35 mμ and dibutyl phthalate (DBP) absorption of 90 to 130 ml/100 g are preferably used, including various carbon blacks. Particularly, N-110–N-330 are preferably used as the carbon black.

The respective components as mentioned above are formulated so as to satisfy the following conditions, namely (I) the amount of the above polyamide is 1 to 20 parts by weight, preferably 2 to 15 parts by weight, per 100 parts by weight of the total amount of the rubber components, (II) the total proportion of natural rubber and/or polyisoprene in the component (A) and the component (B) is 60 to 100% by weight, preferably 90% by weight or more, (III) the amount of carbon black is 30 to 60 parts by weight, preferably 40 to 55 parts by weight, based on 100 parts by weight of the total amount of the rubber components, and (IV) the vulcanized product obtained has a hardness of 55° to 75°, preferably 65° to 75°, as measured by the JIS K6301 A type spring system hardness test. If the amount of the polyamide (fine short fibers) is less than the above lower limit, the cut resistance and abrasion resistance of the rubber crawler will be lowered, and if it is more than the above upper limit, the Mooney viscosity of the formulated product becomes greater, whereby the rubber crawler moldability is reduced. If the amount of carbon black is smaller than the lower limit of the above range, the hardness and abrasion resistance of the vulcanized product are reduced, and if it is more than the upper limit of the above range, ML of the rubber composition becomes greater, whereby the rubber crawler moldability is reduced. If the proportion of the rubber is outside the above range, the cut resistance of the vulcanized product will be lowered. Also, if the hardness of the vulcanized product is outside the above range, the running performance of the rubber crawler will be lowered.

The rubber composition to be used in the present invention can be prepared by kneading the above respective components by a kneader such as a banbury mixer, or rolls at 50° to 180° C. for about 1 to 60 minutes. The rubber composition is formulated with additives such as vulcanizing agents, reinforcing agents, fillers, vulcanization accelerators, vulcanization acceleration aids, antioxidants, naphthenic or aromatic process oils, within the range which does not alter the effects of the present invention, to prepare the composition. As the process oil, aroamtic type oil with which the mechanical performance of the vulcanized product can be improved may be used at a relatively small content (0 to 15 phr). The antioxidant is preferably used primarily as a combination of an antioxidant for ozone resistance with a paraffin wax. The amount thereof may be 1 to 5 phr. For the vulcanization system, preferably a vulcanization accelerator (preferably sulfenamide type, thiazole type) and sulfur (slightly greater amount preferable for chip cut resistance) is used. The rubber crawler of the present invention can be produced according to the method known per se by a combination of rubber materials with core metal and cords, etc.

The composition to be used in the present invention has an excellent moldability due to a small Mooney viscisoty, and yet a good cut resistance with a high tear strength and abrasion resistance, and therefore, can be used instead of the rubber materials known in the art, for a rubber crawler running primarily on non-level ground surfaces such as for vehicles for construction, farm tractors, combat tanks, snow mobiles, etc.

EXAMPLES

The present invention will now be further illustrated in detail by, but is by no means limited to, the following Examples, wherein "percentages" and "parts" are all by weight unless otherwise noted.

The physical properties of the vulcanized products conducted for evaluation of the (reinforced) rubber compositions obtained in the Examples, Comparative Examples and Reference Examples were measured according to JIS K6301.

EXAMPLE 1-1

Into a brabender plastograph set at 220° C., 50 r.p.m., 100 parts of a natural rubber (NR) with a melt viscosity of $1 \times 10^6$ poise, and 1.0 part of an antioxidant of N-(3-methacryloyloxy-2-hydroxypropyl)-N'-phenyl-p-phenylenediamine [Noclac Gl, Oouc. Shinko Kagaku Kogyo K.K.] were thrown, and after kneading for 30 seconds, 51 parts of pellets prepared by previously blending 100 parts by weight of a nylon 6 (trade name: 1030B, produced by Ube Kosan K.K., m.p. 221° C., molecular weight 30,000) with 2 parts by weight of N-β(aminoethyl)γ-aminopropyltrimethoxysilane (trade name: KBM603, produced by Shinetsu Kagaku Kogyo K.K., hereinafter called Silane A) were thrown, followed by kneading for 13 minutes (during this period, the temperature in the brabender was elevated to 230° C.), to obtain a kneaded product. The kneaded product obtained was extruded into a strand by a mmμ extruder (produced by Haake Co.) having a circular die with an inner nozzle diameter of 2 mm and a ratio of length to inner diameter (L/D) of 2, and then the extrudate was wound up on a bobbin at a draft ratio of 10 (at speed of 38.8 m/min.) via guide rolls set 3 m immediately below the nozzle. About 500 of the wound up products were bundled into a sheet (thickness about 2 mm, width about 150 mm), and the sheet was roll stretched by about 10-fold through a pair of rolling rolls at a roll gap of 0.2 mm and a temperature of 60° C. to obtain a masterbatch of a reinforced rubber composition.

Fractionation, measurement of bound rubber content

Two (2) grams of the reinforced rubber composition obtained in Example 1-1 were added to 200 ml of toluene at 80° C. to dissolve the rubbery components in the reinforced rubber composition, and the slurry obtained was centrifuged at room temperature to separate the solution portion from the precipitate portion. For the precipitate portion, the above operation was repeated 7 times, and thereafter, the precipitate portion was dried to obtain nylon fibers. The nylon fibers were dissolved in a solvent mixture of phenol and ortho-dichlorobenzene and analyzed by nucleomagnetic resonance spectrum (NMR) of $^1$H (internal reference: tetramethylsilane), and for the respective peaks of the methyl group and the methylene group attributable to rubber, the methylene group adjacent to the CO group, the methylene group adjacent to the NH group, and three other methylene groups attributable to nylon from the NMR chart, the molar ratio of nylon to rubber was determined according to the cut area method to calculate the bound rubber content. Also, the shape of the above nylon fibers was measured, for about 200 fibers, by a scanning type microscope with a magnification of $\times 10,000$. The fibers were found to be extremely fine short fibers with a circular cross-section. The results are summarized in Table 1-1.

Evaluation test

The reinforced rubber composition obtained in Example 1-1 was vulcanized according to the formulations shown in Table 1-2 at 145° C. for 30 minutes, and the physical properties were measured. The results are shown in Table 1-2.

EXAMPLE 1-2

Into a hopper of a 30 mmφ monoaxial extruder (L/D=26) set at 240° C., a natural rubber (NR) with a melt viscosity of $5 \times 10^5$ poise and N-(3-methacryloyloxy-2-hydroxypropyl)-N'-phenyl-p-phenylenediamine and the nylon pellets previously kneaded with the silane A used in Example 1-1 were thrown at a ratio of the natural rubber/N-(3-methacryloyloxy-2-hydroxypropyl)-N'-phenyl-p-phenylenediamine/nylon pellets of 100/1/51, and extrusion was effected at a rate of 2 kg/hr to obtain a kneaded product. Subsequent operations were practiced in the same manner as in Example 1-1.

The results are summarized in Table 1-1 and Table 1-2.

EXAMPLE 1-3

Into a brabender plastograph set at 220° C., 50 r.p.m., were thrown 100 parts of a natural rubber (NR) with a viscosity of $1 \times 10^6$ poise and 1.0 part of N-(3-methacryloyloxy-2-hydroxypropyl)-N'-phenyl-p-phenylenediamine, and after mastication for 30 seconds, 50 parts by weight of a 6-nylon (trade name 1030B, produced by Ube Kosan K.K.) and 1 part by weight of the silane A were thrown in, followed by kneading for 13 minutes, to obtain a kneaded product. Subsequent operations were practiced in the same manner as in Example 1-1.

The results are summarized in Table 1-1 and Table 1-2.

EXAMPLE 1-4

Example 1-1 was repeated except that N-β(aminoethyl)γ-aminopropylmethyldimethoxysilane (trade name: KBM 502, produced by Shinetsu Kagaku Kogyo K.K., hereinafter called silane B) was used in place of the silane A.

The results are summarized in Table 1-1 and Table 1-2.

EXAMPLE 1-5

Example 1-1 was repeated except that vinyltris(β-methoxyethoxy)silane (trade name: KBM 1003, produced by Shinetsu Kagaku Kogyo K.K., hereinafter called silane C) was used in place of the silane A.

The results are summarized in Table 1-1 and Table 1-2.

EXAMPLE 1-6

Example 1-1 was repeated except that γ-methacryloxypropyltrimethoxysilane (trade name: KBM 503, produced by Shinetsu Kagaku Kogyo K.K., hereinafter called silane D) was used in place of the silane A.

The results are summarized in Table 1-1 and Table 1-2.

EXAMPLE 1-7

Example 1-1 was repeated except that γ-mercaptopropyltrimethoxysilane (trade name: KBM 803, produced by Shinetsu Kagaku Kogyo K.K., hereinafter called silane E) was used in place of the silane A.

The results are summarized in Table 1-1 and Table 1-2.

EXAMPLE 1-8

Example 1-1 was repeated except that β-(3,4-epoxycyclohexyl)ethyltrimethoxysilane (trade name: KBM 303, produced by Shinetsu Kagaku Kogyo K.K., hereinafter called silane F) was used in place of the silane A.

The results are summarized in Table 1-1 and Table 1-2.

EXAMPLE 1-9

Example 1-1 was repeated except that γ-chloropropyltrimethoxysilane (trade name: KBM 703, produced by Shinetsu Kagaku Kogyo K.K., hereinafter called silane G) was used in place of the silane A.

The results are summarized in Table 1-1 and Table 1-2.

EXAMPLE 1-10

Example 1-1 was repeated except that N-β(vinylbenzylaminoethyl)-γ-aminopropyltrimethoxysilane hydrochloride (trade name: SZ-6032, produced by Toray Silicone K.K., hereinafter called silane H) was used in place of the silane A.

The results are summarized in Table 1-1 and Table 1-2.

COMPARATIVE EXAMPLE 1-1

Into a brabender plastograph set at 220° C., 50 r.p.m. were thrown 100 parts of a natural rubber (NR) with a viscosity of $1 \times 10^6$ poise and N-(3-methacryloyloxy-2-hydroxypropyl)-N'-phenyl-p-phenylenediamine, and after mastication for 30 seconds, 50 parts by weight of a 6-nylon (1030B) were thrown in, followed by kneading for 4.5 minutes, then 2.25 parts of a phenolformaldehyde precondensate (trade name: 550 PL, produced by Meiwa Kasei K.K.) were thrown in and kneaded for 3 minutes, and thereafter, 0.225 parts of hexamethylenetetramine were thrown in and kneaded for 3.5 minutes, to obtain a kneaded product. Subsequent operations were practiced in the same manner as in Example 1-1.

The results are summarized in Table 1-1 and Table 1-2.

EXAMPLE 1-11

Example 1-1 was repeated except that a polyisoprene (Kuraplene IR-10) was used in place of the natural rubber (NR).

The results are summarized in Table 1-1 and Table 1-2.

EXAMPLE 1-12

Example 1-1 was repeated except that an isopreneisobutylene copolymer (Essobutyl 365) was used in place of the natural rubber (NR).

The results are summarized in Table 1-1 and Table 1-2.

EXAMPLE 1-13

Into a brabender plastograph set at 200° C., 50 r.p.m., 100 parts of a cis-1,4-polybutadiene (UBEPOLBR-150, produced by Ube Kosan K.K.) and 1.0 part of N-(3-methacryloyloxy-2-hydroxypropyl)-N'-phenyl-p-phenylenediamine (Noclac G1, produced by Oouch Shinko Kagaku K.K.) were thrown in, and after mastication for 30 seconds, 51 parts of pellets previously kneaded with 2 parts by weight of the silane A per 100 parts by weight of a nylon 12 (trade name: 3035U, produced by Ube Kosan K.K., m.p. 176° C.) were thrown in, followed by kneading for 10 minutes (during this operation, the temperature in the brabender was elevated to 205° C.), to obtain a kneaded product. The kneaded product obtained was extruded into a stand by a 20 mmφ extruder (produced by Haake Co.) having a circular die with a nozzle inner diameter of 2 mm and a ratio of length to inner diameter (L/D) of 2 at a die setting temperature of 220° C. Subsequent operations were the same as in Example 1-1.

The results are summarized in Table 1-1 and Table 1-2.

EXAMPLE 1-14

Example 1-1 was repeated except that 52 parts of the pellets of 100 parts by weight of a nylon 6 (trade name: 1013B, produced by Ube Kosan K.K., m.p. 221° C., molecular weight 13,000) previously kneaded with 4 parts by weight of the silane A were used.

The results are summarized in Table 1-1 and Table 1-2.

EXAMPLE 1-15

Example 1-1 was repeated except that 30.6 parts of the nylon previously kneaded with the silane A were used.

The results are summarized in Table 1-1 and Table 1-2.

EXAMPLE 1-16

Example 1-1 was repeated except that 71.4 parts of the nylon previously kneaded with the silane A were used.

The results are summarized in Table 1-1 and Table 1-2.

EXAMPLE 1-17

Example 1-1 was repeated except that 102 parts of the nylon previously kneaded with the silane A were used.

The results are summarized in Table 1-1 and Table 1-2.

COMPARATIVE EXAMPLE 1-2

Example 1-1 was repeated except that 122.4 parts of the nylon previously kneaded with the silane A were used.

The results are summarized in Table 1-1 and Table 1-2.

EXAMPLE 1-18

Example 1-1 was repeated except that 50.25 parts by weight of pellets previously kneaded with 0.5 part by weight of the silane A per 100 parts by weight of the nylon 6 (1030B) were used.

The results are summarized in Table 1-1 and Table 1-2.

EXAMPLE 1-19

Example 1-1 was repeated except that 50.5 parts by weight of pellets previously kneaded with 1.0 part by weight of the silane A per 100 parts by weight of the nylon 6 (1030B) were used.

The results are summarized in Table 1-1 and Table 1-2.

COMPARATIVE EXAMPLE 1-3

Example 1-1 was repeated except that 53 parts by weight of pellets of 100 parts by weight of the nylon 6 (1030B) previously kneaded with 6.0 parts by weight of the silane A were used.

The results are summarized in Table 1-1 and Table 1-2.

COMPARATIVE EXAMPLE 1-4

Example 1-1 was repeated except that no silane A was used.

The results are summarized in Table 1-1 and Table 1-2.

COMPARATIVE EXAMPLE 1-5

Example 1-11 was repeated except that no silane A was used.

The results are summarized in Table 1-1 and Table 1-2.

COMPARATIVE EXAMPLE 1-6

Example 1-12 was repeated except that no silane A was used.

The results are summarized in Table 1-1 and Table 1-2.

COMPARATIVE EXAMPLE 1-7

Example 1-13 was repeated except that no silane A was used.

The results are summarized in Table 1-1 and Table 1-2.

TABLE 1-1

| | Compositions and physical properties | | | | | | | | | | |
|---|---|---|---|---|---|---|---|---|---|---|---|
| | Reinforced rubber composition (master batch) (wt. parts) | | | | | | | Nylon fiber in reinforced rubber composition (master batch) | | | |
| Examples and comparative examples | Rubber | | Nylon | | Silane coupling agent | | Noclac Gl Amount | Production device for reinforced rubber composition | Bound rubber content (wt. %) | Shape of Nylon | Form of fiber | |
| | Kind | Amount | kind | Amount | Kind | Amount | | | | | Average fiber distortion ($\mu$) | Fiber length ($\mu$) |
| Example 1-1 | NR | 100 | 1030B | 50 | Silane A | 2.0 | 1.0 | Brabender plastograph | 23 | Fine short fibers | 0.20 | $\geq 15$ |
| Example 1-2 | NR | 100 | 1030B | 50 | Silane A | 2.0 | 1.0 | 30 mm$\phi$ monoaxial extruder | 20 | Fine short fibers | 0.21 | $\geq 15$ |
| Example 1-3 | NR | 100 | 1030B | 50 | Silane A | 2.0 | 1.0 | Brabender plastograph | 15 | Fine short fibers | 0.28 | $\geq 15$ |
| Example 1-4 | NR | 100 | 1030B | 50 | Silane B | 2.0 | 1.0 | Brabender plastograph | 18 | Fine short fibers | 0.20 | $\geq 15$ |
| Example 1-5 | NR | 100 | 1030B | 50 | Silane C | 2.0 | 1.0 | Brabender plastograph | 18 | Fine short fibers | 0.20 | $\geq 15$ |
| Example 1-6 | NR | 100 | 1030B | 50 | Silane D | 2.0 | 1.0 | Brabender plastograph | 18 | Fine short fibers | 0.21 | $\geq 15$ |
| Example 1-7 | NR | 100 | 1030B | 50 | Silane E | 2.0 | 1.0 | Brabender plastograph | 18 | Fine short fibers | 0.21 | $\geq 15$ |
| Example 1-8 | NR | 100 | 1030B | 50 | Silane F | 2.0 | 1.0 | Brabender plastograph | 15 | Fine short fibers | 0.24 | $\geq 15$ |
| Example 1-9 | NR | 100 | 1030B | 50 | Silane G | 2.0 | 1.0 | Brabender plastograph | 17 | Fine short fibers | 0.22 | $\geq 15$ |
| Example 1-10 | NR | 100 | 1030B | 50 | Silane H | 2.0 | 1.0 | Brabender plastograph | 17 | Fine short fibers | 0.22 | $\geq 15$ |
| Comparative Example 1-1 | NR | 100 | 1030B | 50 | Novolac | 2.5 | 1.0 | Brabender plastograph | 12 | Fine short fibers | 0.24 | $\geq 15$ |
| Example 1-11 | IR | 100 | 1030B | 50 | Silane A | 2.0 | 1.0 | Brabender plastograph | 22 | Fine short fibers | 0.20 | $\geq 15$ |
| Example 1-12 | IIR | 100 | 1030B | 50 | Silane A | 2.0 | 1.0 | Brabender plastograph | 14 | Fine short | 0.22 | $\geq 15$ |

TABLE 1-1-continued

Compositions and physical properties

| Examples and comparative examples | Reinforced rubber composition (master batch) (wt. parts) | | | | Silane coupling agent* | | Noclac G1 Amount | Production device for reinforced rubber composition | Nylon fiber in reinforced rubber composition (master batch) | | | |
|---|---|---|---|---|---|---|---|---|---|---|---|---|
| | Rubber | | Nylon | | | | | | Bound rubber content (wt. %) | Shape of Nylon | Form of fiber | |
| | Kind | Amount | kind | Amount | Kind | Amount | | | | | Average fiber distortion (μ) | Fiber length (μ) |
| Example 1-13 | BR | 100 | 3035U | 50 | Silane A | 2.0 | 1.0 | Brabender plastograph | 13 | Fine short fibers | 0.25 | ≧15 |
| Example 1-14 | NR | 100 | 1013B | 50 | Silane A | 4.0 | 1.0 | Brabender plastograph | 23 | Fine short fibers | 0.20 | ≧15 |
| Example 1-15 | NR | 100 | 1030B | 30 | Silane A | 2.0 | 1.0 | Brabender plastograph | 22 | Fine short fibers | 0.20 | ≧15 |
| Example 1-16 | NR | 100 | 1030B | 70 | Silane A | 2.0 | 1.0 | Brabender plastograph | 20 | Fine short fibers | 0.22 | ≧15 |
| Example 1-17 | NR | 100 | 1030B | 100 | Silane A | 2.0 | 1.0 | Brabender plastograph | 18 | Fine short fibers | 0.28 | ≧15 |
| Comparative Example 1-2 | NR | 100 | 1030B | 120 | Silane A | 2.0 | 1.0 | Brabender plastograph | 10 | Thick fiber many films | 0.50 | ≧15 |
| Example 1-18 | NR | 100 | 1030B | 50 | Silane A | 0.5 | 1.0 | Brabender plastograph | 12 | Fine short fibers | 0.23 | ≧15 |
| Example 1-19 | NR | 100 | 1030B | 50 | Silane A | 1.0 | 1.0 | Brabender plastograph | 15 | Fine short fibers | 0.22 | ≧15 |
| Comparative Example 1-3 | NR | 100 | 1030B | 50 | Silane A | 6.0 | 1.0 | Brabender plastograph | 18 | Thick fiber | 0.40 | ≧5 |
| Comparative Example 1-4 | NR | 100 | 1030B | 50 | — | 0 | 1.0 | Brabender plastograph | 0 | Thick fiber many films | 5.0 | Some very long |
| Comparative Example 1-5 | IR | 100 | 1030B | 50 | — | 0 | 1.0 | Brabender plastograph | 0 | Thick fiber many films | 5.0 | Some very long |
| Comparative Example 1-6 | IIR | 100 | 1030B | 50 | — | 0 | 1.0 | Brabender plastograph | 0 | Thick fiber many films | 8.0 | Some very long |
| Comparative Example 1-7 | BR | 100 | 1030B | 50 | — | 0 | 1.0 | Brabender plastograph | 0 | Thick fiber many films | 7.5 | Some very long |

*Silane amount is parts based on 100 parts of Nylon.

TABLE 1-2

| | Example 1-1 | Example 1-2 | Example 1-3 | Example 1-4 | Example 1-5 | Example 1-6 | Example 1-7 | Example 1-8 |
|---|---|---|---|---|---|---|---|---|
| Amount of reinforced rubber composition (parts) | 18 | 18 | 18 | 18 | 18 | 18 | 18 | 18 |
| Amount of NR (parts) | 88 | 88 | 88 | 88 | 88 | 88 | 88 | 88 |
| Amount of carbon black[1] (parts) | 40 | 40 | 40 | 40 | 40 | 40 | 40 | 40 |
| Process oil (parts) | 10 | 10 | 10 | 10 | 10 | 10 | 10 | 10 |
| Zinc oxide (parts) | 3 | 3 | 3 | 3 | 3 | 3 | 3 | 3 |
| Stearic acid (parts) | 2 | 2 | 2 | 2 | 2 | 2 | 2 | 2 |
| 810 NA[2] (parts) | 1 | 1 | 1 | 1 | 1 | 1 | 1 | 1 |
| NOBS[3] (parts) | 0.5 | 0.5 | 0.5 | 0.5 | 0.5 | 0.5 | 0.5 | 0.5 |
| S (parts) | 2.5 | 2.5 | 2.5 | 2.5 | 2.5 | 2.5 | 2.5 | 2.5 |
| Nylon/Total rubber × 100 (wt. %) | 6 | 6 | 6 | 6 | 6 | 6 | 6 | 6 |
| 100% modulus (kg/cm$^2$) | 60 | 61 | 71 | 60 | 62 | 61 | 63 | 68 |
| 300% modulus (kg/cm$^2$) | 150 | 152 | 155 | 150 | 155 | 153 | 159 | 154 |
| Tensile strength at break (kg/cm$^2$) | 298 | 300 | 296 | 295 | 303 | 301 | 303 | 295 |
| Elongation (%) | 520 | 518 | 520 | 515 | 528 | 517 | 525 | 515 |
| Crack growth speed (times) | 65,300 | 64,500 | 51,900 | 64,800 | 63,300 | 64,700 | 62,500 | 53,200 |

TABLE 1-2-continued

|  | Example 1-9 | Example 1-10 | Comparative Example 1-1 | Example 1-11 | Example 1-12 | Example 1-13 | Example 1-14 | Example 1-15 |
|---|---|---|---|---|---|---|---|---|
| Amount of reinforced rubber composition (parts) | 18 | 18 | 18 | 18 | 18 | 18 | 18 | 26 |
| Amount of NR (parts) | 88 | 88 | 88 | 88 | 88 | 88 | 88 | 80 |
| Amount of carbon black[1] (parts) | 40 | 40 | 40 | 40 | 40 | 40 | 40 | 40 |
| Process oil (parts) | 10 | 10 | 10 | 10 | 10 | 10 | 10 | 10 |
| Zinc oxide (parts) | 3 | 3 | 3 | 3 | 3 | 3 | 3 | 3 |
| Stearic acid (parts) | 2 | 2 | 2 | 2 | 2 | 2 | 2 | 2 |
| 810 NA[2] (parts) | 1 | 1 | 1 | 1 | 1 | 1 | 1 | 1 |
| NOBS[3] (parts) | 0.5 | 0.5 | 0.5 | 0.5 | 0.5 | 0.5 | 0.5 | 0.5 |
| S (parts) | 2.5 | 2.5 | 2.5 | 2.5 | 2.5 | 2.5 | 2.5 | 2.5 |
| Nylon/Total rubber × 100 (wt. %) | 6 | 6 | 6 | 6 | 6 | 6 | 6 | 6 |
| 100% modulus (kg/cm$^2$) | 65 | 67 | 59 | 61 | 68 | 70 | 63 | 52 |
| 300% modulus (kg/cm$^2$) | 152 | 153 | 148 | 152 | 160 | 161 | 158 | 146 |
| Tensile strength at break (kg/cm$^2$) | 296 | 298 | 301 | 298 | 290 | 284 | 305 | 312 |
| Elongation (%) | 520 | 515 | 530 | 515 | 505 | 490 | 530 | 540 |
| Crack growth speed (times) | 58,700 | 54,500 | 32,400 | 65,200 | 54,100 | 52,400 | 61,800 | 73,600 |

|  | Example 1-16 | Example 1-17 | Comparative Example 1-2 | Example 1-18 | Example 1-19 | Comparative Example 1-3 | Comparative Example 1-4 |
|---|---|---|---|---|---|---|---|
| Amount of reinforced rubber composition (parts) | 14.6 | 12 | 11 | 18 | 18 | 18 | 18 |
| Amount of NR (parts) | 91.4 | 94 | 95 | 88 | 88 | 88 | 88 |
| Amount of carbon black[1] (parts) | 40 | 40 | 40 | 40 | 40 | 40 | 40 |
| Process oil (parts) | 10 | 10 | 10 | 10 | 10 | 10 | 10 |
| Zinc oxide (parts) | 3 | 3 | 3 | 3 | 3 | 3 | 3 |
| Stearic acid (parts) | 2 | 2 | 2 | 2 | 2 | 2 | 2 |
| 810 NA[2] (parts) | 1 | 1 | 1 | 1 | 1 | 1 | 1 |
| NOBS[3] (parts) | 0.5 | 0.5 | 0.5 | 0.5 | 0.5 | 0.5 | 0.5 |
| S (parts) | 2.5 | 2.5 | 2.5 | 2.5 | 2.5 | 2.5 | 2.5 |
| Nylon/Total rubber × 100 (wt. %) | 6 | 6 | 6 | 6 | 6 | 6 | 6 |
| 100% modulus (kg/cm$^2$) | 65 | 71 | 90 | 71 | 65 | 40 | 94 |
| 300% modulus (kg/cm$^2$) | 161 | 163 | 170 | 155 | 153 | 120 | 176 |
| Tensile strength at break (kg/cm$^2$) | 287 | 282 | 250 | 296 | 298 | 290 | 247 |
| Elongation (%) | 500 | 490 | 400 | 520 | 525 | 570 | 390 |
| Crack growth speed (times) | 64,100 | 50,900 | 20,700 | 56,200 | 62,100 | 51,100 | 15,200 |

Note
[1] carbon black (trade name: Diablack H, produced by Mitsubishi Kasei Kogyo K. K.);
Note
[2] N-phenyl-N-isopropyl-p-phenylenediamine;
Note
[3] mixture of the two compounds of N-oxyethylene-2-benzothiazyl-sulfenamide (70%) and dibenzo-thiazylsulfide (10%).

Note 1) carbon black (trade name: Diablack H, produced by Mitsubishi Kasei Kogyo K.K.);

Note 2) N-phenyl-N-isopropyl-p-phenylenediamine;

Note 3) mixture of the two compounds of N-oxyethylene-2-benzothiazyl-sulfenamide (70%) and dibenzo-thiazylsulfide (10%).

The starting material names, trade names and manufacturing company names used in Examples 2-1 to 2-15 and comparative Examples 2-1 and 2-2 are summarized in Table 2-1 shown below.

EXAMPLE 2-1

Into a banbury mixer controlled at 150° C. were thrown 100 parts of EP-33, 5 parts of 1030 u (nylon 6), 2 parts of Tamanol 510, 1 part of Noclac G1 and 0.5 parts of KBM 603, and the mixture was kneaded for 10 minutes. During this period, the temperature in the mixer was elevated to 240° C., 1030 u was melted to be finely dispersed into EP-33, and EP-33 was found to be grafted as the interfaces of the dispersed particles. The kneaded product obtained was extruded through an extruder by a die with an inner diameter of 2 mm, wound up at a draft ratio of 20, and rolled through rolls to give the reinforced rubber composition of the present invention.

The reinforced rubber composition was analyzed as described below.

Two (2) grams each of the reinforced rubber compositions were added to 200 ml of toluene at room temperature or 80° C. to dissolve the rubbery components in the reinforced rubber composition, and the slurry obtained was centrifuged at room temperature to separate the solution portion from the precipitate portion.

For the precipitate portion, the above operation of toluene dissolution and centrifugation was repeated 7 times, and thereafter, the precipitate portion was dried to obtain nylon fibers. The shape and the fiber diameter of the nylon fibers obtained were measured for 400 fibers by a scanning type electron microscope with a magnification of ×10,000.

Also, the nylon fibers were dissolved in a solvent mixture of phenol and ortho-dichlorobenzene and analyzed by nucleomagnetic resonance spectrum (NMR) of $^1H$ (internal reference: tetramethylsilane) and, for the respective peaks of the methylene group adjacent to NH group attributable to nylon and the methyl group attributable to rubber from the NMR chart, the areas were determined and the molar ratio of nylon to rubber and the bound rubber content were calculated.

EXAMPLE 2-2

A reinforced rubber composition of the present invention was obtained in the same manner as in Example 2-1 except for changing the amount of 1030 u used to 50 parts by weight and the amount of KBM 603 used to 1 part by weight. The reinforced rubber composition obtained was analyzed according to the same procedure as in Example 2-1.

EXAMPLE 2-3

A reinforced rubber composition of the present invention was obtained in the same manner as in Example 1 except for changing the amount of 1030 u used to 80 parts by weight and 1 part by weight of KBC 1003 was added. The reinforced rubber composition obtained was analyzed according to the same procedure as in Example 2-1.

COMPARATIVE EXAMPLE 2-1

A rubber composition was obtained in the same manner as in Example 2-2 except for changing the amount of KBM 603 used to 0.1 part by weight. The rubber composition obtained was analyzed according to the same procedure as in Example 2-1.

EXAMPLE 2-4

An amount of 100 parts by weight of EP 33, 2 parts by weight of Tamanol 510 and 1 part by weight of Noclac G1 were mixed on 10 inch rolls. The mixture obtained, 1030 u, KBM 603 and KBM 803 were continuously fed at a feeding ratio of 103:50:0.5:0.5 into a 65 mm kneading extruder (produced by Ikegai Tekko). The temperatures at the screw tip, the head and the nozzle were set at 250° C., and the discharged amount was 16 kg/hr. The discharged product was fed into a 50 mm extruder (produced by Nippon Seiko), spun at a temperature of 250° C., wound up at a draft ratio of 15 and a wind-up speed of 45 m/min., and fed into a 60 mm plasticizing extruder (produced by Sanyo Seisakusho) to obtain a reinforced rubber composition of the present invention. At this time, the plasticizing temperature was 120° C. The rubber composition obtained was analyzed according to the same procedure as in Example 2-1.

EXAMPLES 2-5-2-6

Reinforced rubber compositions of the present invention were obtained respectively in the same manner as in Example 2-4 except that the amount and the kind of the coupling agent were changed (in Example 2-5, 1 part by weight of Plainact KR 44 was used, and in Example 2-6, each 0.5 part by weight of KBM 603 and Plainact KR7 was used). The rubber compositions obtained were analyzed in the same manner as in Example 2-1.

EXAMPLE 2-7

An amount of 100 parts by weight of EP 33, 2 parts by weight of Tackiroll EP 20 and 1 part by weight of Nowguard XL-1 were mixed on 10 inch rolls. The mixture, 2020 u, KBM 603 and Plainact KR 7 were continuously fed into a 30 mm twin screw extruder (produced by Nakatani Seisakusho) at a feeding ratio of 103:50:0.5:0.5. The temperatures of the screw tip, the head and the nozzle were set at 270° C., and the discharged amount was 5 kg/hr. The starting materials kneaded in the extruder were extruded through a nozzle with circular cross-sections (L/D=2, D=2 mm$\phi$, 10 holes) and wound up at a draft ratio of 15. The wound up product was plasticized by 10 inch rolls to obtain a reinforced rubber composition of the present invention. The rubber composition obtained was analyzed according to the same procedure as Example 2-1.

EXAMPLE 2-8

A reinforced rubber composition of the present invention was obtained in the same manner as in Example 2-7 except for using EP 43 in place of EP 33. The rubber composition obtained was analyzed in the same manner as in Example 2-1.

EXAMPLE 2-9

A reinforced rubber composition was prepared in the same manner as in Example 2-8 except for changing the kind and the amount of the coupling agent (using 1 part by weight of KBM 603 and 1 part by weight of maleic anhydride). The rubber composition obtained was analyzed according to the same procedure as in Example 2-1.

EXAMPLE 2-10

A reinforced rubber composition was prepared in the same manner as in Example 2-7 except for changing the kind and the amount of the coupling agent (using 1 part by weight of Plainact KR 44 and 1 part by weight of maleic anhydride). The rubber composition obtained was analyzed according to the same procedure as in Example 2-1.

The composition ratios of the starting materials and the analytical results of the reinforced rubber compositions obtained in Examples 2-1 to 2-10 and Comparative Example 2-1 are summarized in Table 2-2 shown below.

Next, the excellent properties of the reinforced rubber compositions of the present invention are clarified by the following Examples (test examples).

EXAMPLE 2-11

An amount of 65.1 parts of the reinforced rubber composition obtained in Example 2-1, 40 parts of EP 22, 50 parts of HAF carbon black, 25 parts of a naphthenic process oil (Cormolex No. 2, produced by Nippon Sekiyu), 5 parts of zinc oxide and 1 part of stearic acid were kneaded by a banbury mixer for 5 minutes. The temperature in the mixer on starting of kneading was 60° C. and the rotor rotational number was 75 RPM. The kneaded product was formulated with 1.5 parts of a vulcanization accelerator TS, 0.5 part of a vulcanization accelerator M and 1.5 parts of sulfur per 100 parts of the rubber components in said kneaded product on 10 inch rolls to prepare an unvulcanized rubber formulated product.

The physical properties of the unvulcanized rubber formulated product and the physical properties of the valcanized rubber of said formulated product were measured as follows.

The shear viscosity $\eta_a$ and the die swell ratio were measured by a Capilograph (produced by Toyo Seiki) and the surface smoothness was examined by visual observation of the surface of the extrudate. The measurement was conducted under the conditions of a temperature of 100° C., a shear rate of 100 sec$^{-1}$ and an L/D of a capillary of 2 (1 mm$\phi$).

Also, the roll processability of the above formulated product was judged by the smoothness of the division of the sheet by rolls and the wind-up characteristic around rolls.

A sheet with a thickness of 2.3 mm was prepared by rolls, placed in a mold for hot press (150 mm×150 mm×20 mm) and a sample was prepared under the conditions of 80° C.×60 minutes (for measurement of green strength of unvulcanized sheet) or 160° C.×30 minutes (for measurement of vulcanized product properties).

The above unvulcanized sheet was punched out by a JIS No. 1 dumbbell in the direction parallel to the grain of said sheet, and the tensile test was conducted by use of the test strip obtained to measure the tensile strength (green strength). The measurement was made at 22° C., the tensile speed 100 mm/min and the distance between gage points 20 mm. The maximum stress in the course of elongation was determined as the green strength.

For the vulcanized sheet, measurement was conducted according to the regulations of JIS K6301. In a normal temperature tensile test, a test strip was prepared by punching by a JIS No. 1 dumbbell in the direction parallel to the grain of the sheet and, in the heat resistant aging test, the above No. 1 dumbbell was exposed in an air atmosphere at 150° C. for 72 hours by a gear type aging tester, and then each dumbbell was measured according to the same method as the above tensile test.

In the tear propagation test, B-type test strip was punched out in the direction perpendicular to the grain of the vulcanized sheet, and the tear strength $T_R$ (kgf/cm) was measured by a tensile tester.

EXAMPLE 2-12

An unvulcanized rubber formulated product was prepared in the same manner as in Example 2-11 except for formulating 61.6 parts of the reinforced rubber composition obtained in Example 2-2 in place of the reinforced rubber composition obtained in Example 2-1 and formulating 60 parts of EP 22. The physical properties of this unvulcanized rubber formulated product and the physical properties of the vulcanized product of said formulated product were measured as in Example 2-11.

EXAMPLE 2-13

An unvulcanized rubber formulated product was prepared in the same manner as in Example 2-11 except for formulating 180 parts of the reinforced rubber composition obtained in Example 2-3 in place of the reinforced rubber composition obtained in Example 2-1 and not formulating EP 22. The physical properties of this unvulcanized rubber formulated product and the physical properties of the vulcanized product of said formulated product were measured as in Example 2-11.

EXAMPLE 2-14

An unvulcanized rubber formulated product was prepared in the same manner as in Example 2-11 except for formulating 30.8 parts of the reinforced rubber composition obtained in Example 2-7 in place of the reinforced rubber composition obtained in Example 2-1 and formulating 80 parts of EP 22. The physical properties of this unvulcanized rubber formulated product and the physical properties of the vulcanized product of said formulated product were measured as in Example 2-11.

EXAMPLE 2-15

An unvulcanized rubber formulated product was prepared in the same manner as in Example 2-11 except for formulating 31 parts of the reinforced rubber composition obtained in Example 2-9 in place of the reinforced rubber composition obtained in Example 2-1 and formulating 80 parts of EP 22. The physical properties of this unvulcanized rubber formulated product and the physical properties of the vulcanized product of said formulated product were measured as in Example 2-11.

COMPARATIVE EXAMPLE 2-2

An unvulcanized rubber formulated product was prepared in the same manner as in Example 2-11 except for not formulating a reinforced rubber composition and formulating 100 parts of EP 22. The physical properties of this unvulcanized rubber formulated product and the physical properties of the vulcanized product of said formulated product were measured as in Example 2-11.

The results of measurement of the physical properties of the unvulcanized rubber formulated products and the physical properties of the vulcanized products of said formulated products are summarized in Table 2-3 shown below.

TABLE 2-1

| Starting materials | Trade name | Manufacturing company |
|---|---|---|
| EPDM | EP 33 | Japan Synthetic Rubber |
|  | EP 43 | Japan Synthetic Rubber |
|  | EP 22 | Japan Synthetic Rubber |
|  | EP 24 | Japan Synthetic Rubber |
| Nylon | 1030u (Nylon 6) | Ube Kosan |
|  | 2020u (Nylon 66) | Ube Kosan |
| Silane coupling agent | KBM 603 | Shinetsu Kagaku |
|  | KBM 803 | Shinetsu Kagaku |
|  | KBC 1003 | Shinetsu Kagaku |
| Titanate type coupling agent | Plainact KR 44 | Ajinomoto |
|  | Plainact KR 7 | Ajinomoto |
| Tackifier | Tamanol 510 | Arakawa Rinsan Kogaku |
|  | Tackiroll EP 20 | Sumitomo Kagaku Kogyo |
| Antioxidant | Noclac Gl | Oouchi Sinko Kagaku- |
|  | Nowguard XL-1 | Uniroyal |

TABLE 2-2

|  |  | Example 2-1 | Example 2-2 | Example 2-3 | Comparative Example 2-1 | Example 2-4 | Example 2-5 | Example 2-6 | Example 2-7 | Example 2-8 | Example 2-9 | Example 2-10 |
|---|---|---|---|---|---|---|---|---|---|---|---|---|
| EP 33 | (parts) | 100 | 100 | 100 | 100 | 100 | 100 | 100 | 100 | — | — | 100 |
| EP 43 | (parts) | — | — | — | — | — | — | — | — | 100 | 100 | — |
| 1030u (Nylon 6) | (parts) | 5 | 50 | 80 | 50 | 50 | 50 | 50 |  |  |  |  |
| 2020u (Nylon 66) | (parts) |  |  |  |  |  |  |  | 50 | 50 | 50 | 50 |

TABLE 2-2-continued

|  |  | Example 2-1 | Example 2-2 | Example 2-3 | Comparative Example 2-1 | Example 2-4 | Example 2-5 | Example 2-6 | Example 2-7 | Example 2-8 | Example 2-9 | Example 2-10 |
| --- | --- | --- | --- | --- | --- | --- | --- | --- | --- | --- | --- | --- |
| KBM 603 | (parts) | 0.5 | 1 | 1 | 0.1 | 0.5 | — | 0.5 | 0.5 | 0.5 | 1 | — |
| KBM 803 | (parts) | — | — | — | — | 0.5 | — | — | — | — | — | — |
| KBC 1003 | (parts) | — | — | 1 | — | — | — | — | — | — | — | — |
| Plainact KR 44 | (parts) | — | — | — | — | — | 1 | — | — | — | — | 1 |
| Plainact KR 7 | (parts) | — | — | — | — | — | — | 0.5 | 0.5 | 0.5 | — | — |
| Maleic anhydride | (parts) | — | — | — | — | — | — | — | — | 1 | 1 |
| Tamanol 510 | (parts) | 2 | 2 | 2 | 2 | 2 | 2 | 2 | — | — | — | — |
| Tackiroll EP 20 | (parts) | — | — | — | — | — | — | — | 2 | 2 | 2 | 2 |
| Noclac G1 | (parts) | 1 | 1 | 1 | 1 | 1 | 1 | 1 | — | — | — | — |
| Nowguard XL-1 | (parts) | — | — | — | — | — | — | — | 1 | 1 | 1 | 1 |
| Shape and fiber diameter of nylon short fibers | (μm) | Fine fibers 0.20 | Fine fibers 0.25 | Fine fibers 0.30 | Film — | Fine fibers 0.27 | Fine fibers 0.28 | Fine fibers 0.26 | Fine fibers 0.25 | Fine fibers 0.24 | Fine fibers 0.23 | Fine fibers 0.24 |
| Bound rubber content (nylon/EPDM rubber) | (%) | 7.5 | 6.0 | 8.5 | 1.5 | 6.0 | 9.0 | 7.0 | 7.0 | 6.5 | 12 | 14 |

TABLE 2-3

|  | Example 2-11 | Example 2-12 | Example 2-13 | Example 2-14 | Example 2-15 | Comparative Example 2-2 |
| --- | --- | --- | --- | --- | --- | --- |
| [Unvalcanized product properties] | | | | | | |
| Shear viscosity $\eta_a$ (poise) | $1.3 \times 10^5$ | $2.1 \times 10^5$ | $5 \times 10^5$ | $1.7 \times 10^5$ | $1.6 \times 10^5$ | $1 \times 10^5$ |
| Die swell ratio ($\gamma = 100 \sec^{-1}$ L/D = 2) | 1.17 | 1.04 | 1.02 | 1.08 | 1.07 | 1.30 |
| Surface of extrudate | Excellent | Good | Slightly bad | Excellent | Excellent | Excellent |
| Green strength (MPa) | 0.65 | 2.1 | 2.7 | 1.7 | 1.9 | 0.19 |
| Roll processability | Excellent | Good | Common | Excellent | Excellent | Excellent |
| [Vulcanized product properties] | | | | | | |
| $M_{100}$ (MPa) | 4.9 | 12.5 | — | 7.2 | 7.5 | 2.3 |
| $T_b$ (MPa) | 16 | 14 | 22 | 17 | 18 | 17 |
| $E_b$ (%) | 420 | 230 | 40 | 410 | 410 | 430 |
| Tear strength $T_R$ (kgf/cm) | 56 | 54 | 73 | 57 | 59 | 52 |
| Heat aging resistance $T_b$ (MPa) | 16 | 23 | 27 | 19 | 20 | 14 |
| Heat aging resistance $E_b$ (%) (150° C.-72 hr.) | 160 | 160 | 60 | 180 | 190 | 140 |

In the following Examples and Comparative Examples, the starting material names, codes, trade names and manufacturing company names used are summarized in Table 3-1.

The reinforced rubber compositions (A) used in Examples and Comparative Examples were prepared according to the following method (i) or (ii).

(i) Into a banbury mixer controlled at 150° C. were thrown 100 parts of EP-1, 2 parts of Tamanol 510, 1 part of Noclac G1 and 70 parts of nylon 6, and the mixture was kneaded for 4 minutes. During this period, the temperature in the mixer was elevated to 230° C. and the nylon 6 was melted. Next, 2 parts of 550PL were added and the mixture was kneaded for 6 minutes, and further 0.2 parts of hexamethylenetetramine was added and kneaded for 3 minutes to effect graft reaction, followed by dumping. The resultant kneaded product was extruded through an extruder by a die with an inner diameter of 2 mm, then stretched at a draft ratio of 20 and a speed of 40 m/min., followed by rolling of the stretched product through rolls. This rolled product is called MS-1, and said MS-1 formulated with EP-3 becomes the reinforced rubber composition (A).

(ii) EP-1 or EP-2 at a rate of 3 kg/hr, nylon 6 or nylon 66 at a rate of 3 kg/hr, Tamanol 510 at a rate of 60 g/hr, Noclac G1 at a rate of 30 g/hr and a coupling agent at a rate of 30 to 60 g/hr were fed quantitatively through the hopper hole into a 30 mm twin screw kneading extruder (produced by Nakatani Seisakusho). The strand discharged from the extruder was wound up at a draft ratio of about 15 and plasticized by rolling rolls. These plasticized products are called MS-2–MS-7, and said MS-2–MS-7 formulated with EP-3 become the reinforced rubber compositions (A).

The composition ratios of MS-1–MS-7 are set forth in Table 3-2 shown below.

EXAMPLE 3-1

An amount of 86 parts of EP-3, 24 parts of MS-1, 2 parts of a methylene acceptor (Sumikanol 620), 50 parts of HAF carbon, 25 parts of a process oil (Cormolex No. 2, produced by Nippon Sekiyu), 5 parts of zinc oxide and 1 part of stearic acid were formulated by kneading in a banbury mixer. The kneaded product was formulated with addition of 2 parts of a methylene donor, 1.5 parts of a vulcanization accelerator TMTM, 0.5 parts of a vulcanization accelerator MBT and 1.5 parts of sulfur on rolls. From the formulated product (rubber composition), a sheet with a thickness of 2 mm was prepared and a test strip was punched out in the form of the JIS No. 1 dumbbell, and subjected to a tensile test to determine the tensile strength and elongation. Also, the above formulated product was formed into a 2 mm sheet and press vulcanized at 160° C. for 30 minutes, a test strip of the vulcanized state was punched out in the form of the JIS No. 3 dumbbell and a tensile test was conducted to determine the $M_{100}$, tensile strength, and elongation.

Measurement was conducted at room temperature, following the method of JIS K6301.

COMPARATIVE EXAMPLE 3-1

A rubber composition was obtained in the same manner as in Example 3-1 except for not formulating the methylene acceptor and methylene donor. For the rubber composition obtained, the same measurements as in Example 3-1 were conducted.

EXAMPLES 3-2–3-4

Except for using reinforced rubber composition (A) formulated with 95–50 parts of EP-3 and 10–100 parts of MS-2, respective rubber compositions were obtained in the same manner as in Example 3-1. The same measurements as in Example 3-1 were conducted for the rubber compositions obtained, respectively.

COMPARATIVE EXAMPLE 3-2

A rubber composition was obtained in the same manner as in Example 3-1 except for using EP-3 in place of the reinforced rubber composition (A). For the rubber composition obtained, the same measurements as in Example 3-1 were conducted.

EXAMPLE 3-5–3-8

Respective rubber compositions were prepared in the same manner as in Example 3-3 except for varying the amounts of the methylene acceptor and the methylene donor or changing the kinds of the above acceptor and the above donor. The same measurements as in Example 3-1 were conducted for the rubber compositions obtained, respectively.

EXAMPLES 3-9–3-11

Respective rubber compositions were prepared in the same manner as in Example 3-3 except for using MS-4, MS-5 or MS-6 in place of MS-2. The same measurements as in Example 3-1 were conducted for the rubber compositions obtained, respectively.

EXAMPLES 3-12–3-13

Respective rubber compositions were prepared in the same manner as in Example 3-3 except for using MS-3 or MS-7 and Nipsil VN3 in place of MS-2 and HAF carbon. The same measurements as in Example 3-1 were conducted for the rubber compositions obtained, respectively.

COMPARATIVE EXAMPLE 3-3

A rubber composition was obtained in the same manner as in Example 3-2 except for increasing the amount of HAF carbon to 100 parts. The same measurements as in Example 3-1 were conducted for the rubber composition obtained.

COMPARATIVE EXAMPLE 3-4

A rubber composition was obtained in the same manner as in Comparative Example 3-2 except for excluding the methylene acceptor and further formulating 40 parts of SANTOWEB as the organic fiber reinforcing agent. The same measurements as in Example 3-1 were conducted for the rubber composition obtained.

COMPARATIVE EXAMPLE 3-5

A rubber composition was obtained in the same manner as in Example 3-4 except for using nylon 6 short fibers as the organic fiber reinforcing agent. The same measurements as in Example 3-1 were conducted for the rubber composition obtained.

The formulated compositions and the results of measurement of the physical properties of the rubber compositions in Examples 3-1–3-13 and Comparative Examples 3-1–3-5 are summarized in the following Table 3-3 (1)–(4).

TABLE 3-1

| Starting materials | Code | Trade name | Manufacturing company |
|---|---|---|---|
| EPDM | EP-1 | PE 33 | Japan Synthetic Rubber |
|  | EP-2 | EP 24 | Japan Synthetic Rubber |
|  | EP-3 | PE 22 | Japan Synthetic Rubber |
| Nylon | Nylon 6 | 1030 u | Ube Kosan |
|  | Nylon 66 | 2020 u | Ube Kosan |
| Coupling agents | Phenolic resin | 550 PL | Meiwa Kagaku |
|  | Silane-1 | KBM 603 | Shinetsu Kagaku |
|  | Silane-2 | KBM 803 | Shinetsu Kagaku |
|  | Silane-3 | KBM 1003 | Shinetsu Kagaku |
|  | Titanate-1 | Plainact KR 44 | Ajinomoto |
|  | Titanate-2 | Plainact KR 7 | Ajinomoto |
| Tackifier |  | Tamanol 510 | Arakawa Rinsan Kagaku |
| Antioxidant |  | Noclac G1 | Oouchi Shinko Kagaku |

TABLE 3-2

|  |  | MS-1 | MS-2 | MS-3 | MS-4 | MS-5 | MS-6 | MS-7 |
|---|---|---|---|---|---|---|---|---|
| EP-1 | (parts) | 100 | 100 | 100 | 100 |  |  |  |
| EP-2 | (parts) |  |  |  |  | 100 | 100 | 100 |
| Nylon 6 | (parts) | 70 | 100 | 100 | 100 | 100 |  |  |
| Nylon 66 | (parts) |  |  |  |  |  | 100 | 100 |
| 550 PL | (parts) | 2 | — | — | — | — | — | — |
| HMTA[1] | (parts) | 0.2 | — | — | — | — | — | — |
| Silane-1 | (parts) | — | 1 | — | — | 1 | 1 | — |
| Silane-2 | (parts) | — | — | 1 | — | — | — | — |
| Silane-3 | (parts) | — | — | 1 | — | — | — | 1 |
| Titanate-1 | (parts) | — | — | — | 1 | — | — | 1 |
| Titanate-2 | (parts) | — | — | — | — | 1 | 1 | — |
| Tamanol 510 | (parts) | 2 | 2 | 2 | 2 | 2 | 2 | 2 |

TABLE 3-2-continued

|  | | MS-1 | MS-2 | MS-3 | MS-4 | MS-5 | MS-6 | MS-7 |
|---|---|---|---|---|---|---|---|---|
| Noclac G1 | (parts) | 1 | 1 | 1 | 1 | 1 | 1 | 1 |

[1]Hexamethylenetetramine

TABLE 3-3

|  |  | Example 3-1 | Comparative Example 3-1 | Comparative Example 3-2 | Example 3-2 | Example 3-3 |
|---|---|---|---|---|---|---|
| Reinforced rubber composition (A) (parts) | EP-3 | 86 | 86 | 100 | 95 | 90 |
|  | MS-1 | 24 | 24 | — | — | — |
|  | MS-2 | — | — | — | 10 | 20 |
| Methylene acceptor (B) (parts) | Resorcin Sumikanol 620[1] | 2 | — | 2 | 2 | 2 |
| Methylene donor (C) (parts) | HMTA Sumikanol 508[2] | 2 | — | 2 | 2 | 2 |
| Inorganic reinforcing agent | HAF carbon Nipsil VN3[3] | 50 | 50 | 50 | 50 | 50 |
| Unvulcanized product properties | Tensile strength (MPa) | 2.8 | 1.2 | 0.33 | 1.9 | 2.7 |
|  | Tensile elongation (%) | 70 | 80 | 240 | 140 | 70 |
| Vulcanized product properties | $M_{100}$ (MPa) | 10 | 8.5 | 3.2 | 6.0 | 9.5 |
|  | Tensile strength (MPa) | 16 | 16 | 16 | 18 | 17 |
|  | Tensile elongation (%) | 300 | 300 | 380 | 390 | 310 |

[1]Resorcin type resin, produced by Sumitomo Kagaku Kogyo.
[2]Melamine type resin, produced by Sumitomo Kagaku Kogyo.
[3]Wet process white carbon, produced by Nippon Silica.

|  |  | Example 3-4 | Example 3-5 | Example 3-6 | Example 3-7 | Example 3-8 |
|---|---|---|---|---|---|---|
| Reinforced rubber composition (A) (parts) | EP-3 | 50 | 90 | 90 | 90 | 90 |
|  | MS-1 | — | — | — | — | — |
|  | MS-2 | 100 | 20 | 20 | 20 | 20 |
| Methylene acceptor (B) (parts) | Resorcin | — | — | — | 0.6 | 1 |
|  | Sumikanol 620 | 2 | 5 | 10 | — | — |
| Methylene donor (C) (parts) | HMTA | — | — | — | 0.3 | 0.5 |
|  | Sumikanol 508 | 2 | 5 | 10 | — | — |
| Inorganic reinforcing agent (parts) | HAF carbon | 50 | 50 | 50 | 50 | 50 |
|  | Nipsil VN3 | — | — | — | — | — |
| Unvulcanized product properties | Tensile strength (MPa) | 3.0 | 2.7 | 2.4 | 1.8 | 2.5 |
|  | Tensile elongation (%) | 30 | 60 | 40 | 80 | 50 |
| Vulcanized product properties | $M_{100}$ (MPa) | 13 | 10 | 12 | 8.8 | 9.2 |
|  | Tensile strength (MPa) | 14 | 16 | 15 | 17 | 16 |
|  | Tensile elongation (%) | 120 | 230 | 180 | 350 | 310 |

|  |  | Example 3-9 | Example 3-10 | Example 3-11 | Example 3-12 | Example 3-13 |
|---|---|---|---|---|---|---|
| Reinforced rubber composition (A) (parts) | EP-3 | 90 | 90 | 90 | 90 | 90 |
|  | MS-3 | — | — | — | 20 | — |
|  | MS-4 | 20 | — | — | — | — |
|  | MS-5 | — | 20 | — | — | — |
|  | MS-6 | — | — | 20 | — | — |
|  | MS-7 | — | — | — | — | 20 |
| Methylene acceptor (B) (parts) | Resorcin Sumikanol 620 | 2 | 2 | 2 | 2 | 2 |
| Methylene donor (C) (parts) | HMTA Sumikanol 508 | 2 | 2 | 2 | 2 | 2 |
| Inorganic reinforcing agent | HAF carbon | 50 | 50 | 50 | — | — |
|  | Nipsil VN3 | — | — | — | 50 | 50 |
| Unvulcanized product properties | Tensile strength (MPa) | 2.2 | 2.1 | 2.1 | 2.2 | 2.0 |
|  | Tensile elongation (%) | 60 | 50 | 50 | 30 | 50 |
| Vulcanized product properties | $M_{100}$ (MPa) | 8.8 | 8.7 | 9.5 | — | 6.6 |
|  | Tensile strength (MPa) | 17 | 17 | 16 | 5.5 | 7.0 |
|  | Tensile elongation (%) | 310 | 310 | 280 | 70 | 110 |

|  |  | Comparative Example 3-3 | Comparative Example 3-4 | Comparative Example 3-5 |
|---|---|---|---|---|
| EPDM (parts) | EP-3 | 100 | 100 | 100 |
| Methylene acceptor (B) (parts) | Sumikanol 620 | 2 | — | — |
| Methylene donor (C) (parts) | Sumikanol 508 | 2 | 2 | 2 |
| Inorganic reinforcing agent (parts) | HAF carbon | 100 | 50 | 50 |
| Organic fiber reinforcing agent (parts) | SANTOWEB[1] | — | 40 | — |
|  | Nylon 6 short fiber[2] | — | — | 20 |
| Unvulcanized product properties | Tensile strength (MPa) | 0.6 | 0.8 | 1.0 |
|  | Tensile elongation (%) | 180 | 50 | 30 |
| Vulcanized product properties | $M_{100}$ (MPa) | 5.9 | 11 | 9.5 |
|  | Tensile strength (MPa) | 15 | 12 | 10 |
|  | Tensile elongation (%) | 300 | 120 | 110 |

[1]Cellulose type short fiber, produced by Monsant Co.
[2]RFL treated short fiber In the following Examples and Comparative Examples, the Mooney viscosity $ML_{1+4}$ (100° C.) of the bead filler rubber composition was measured according to JIS K 6300, and the physical properties (tensile modulus, tensile strength, flexing number, hardness) were measured according to JIS K 6301.

The compositions (formulated ratios) of the reinforced rubber compositions in the following Examples 4-1 to 4-16 and Comparative Examples 4-1–4-2, the compositions (formulated ratios) of the bead filler rubber compositions of the present invention and the physical properties of the bead filler rubber compositions of the present invention are summarized in Table 4-1 and Table 4-2 shown below.

EXAMPLE 4-1

Into a brabender plastograph set at 220° C., 50 r.p.m., 100 parts of a natural rubber (NR) with a melt viscosity of $1 \times 10^6$ poise and 1.0 part of an antioxidant of N-(3-methacrylolyoxy-2-hydroxypropyl)-N'-phenyl-p-phenylenediamine [Noclac G-1, Oouchi Shinko Kagaku Kogyo K.K.] were thrown, and after kneading for 30 seconds, 51 parts of pellets prepared by previously blending 100 parts by weight of a nylon 6 (trade name: 1030B, produced by Ube Kosan K.K., m.p. 221° C., molecular weight 30,000) with 2 parts by weight of N-$\beta$(aminoethyl)$\gamma$-aminopropyltrimethoxysilane (trade name: KMB603, produced by Shinetsu Kagaku Kogyo K.K., hereinafter called Silane A) were thrown in, followed by kneading for 13 minutes (during this period, the temperature in the brabender was elevated to 230° C.), to obtain a kneaded product. The kneaded product obtained was extruded into a strand by a 20 mm$\phi$ extruder (produced by Haake Co.) having a circular die with a nozzle inner diameter of 2 mm and a ratio of length to inner diameter (L/D) of 2, and then the extrudate was wound up on a bobbin at a draft ratio of 10 (at speed of 38.8 m/min.) via guide rolls set 3 m immediately below the nozzle. About 500 of the wound up products were bundled into a sheet (thickness about 2 mm, width about 150 mm), and the sheet was roll stretched by about 10-fold through a pair of rolling rolls at a roll gap of 0.2 mm and a temperature of 60° C. to obtain a reinforced rubber composition (masterbatch) (Sample 4-1).

Thereafter, by means of a banbury set at 90° C., 77 r.p.m., the formulation components of the recipe shown in Table 4-2 excluding the vulcanization accelerator and sulfur were kneaded to obtain a kneaded product, and subsequently, the kneaded product was kneaded with an accelerating agent and sulfur on 10 inch rolls, which was then rolled into a sheet, followed by vulcanization in a mold to obtain a vulcanized product. Vulcanization was conducted at 145° C. for 40 minutes.

EXAMPLE 4-2

Example 4-1 was repeated except that vinyltris($\beta$-methoxyethoxy)silane (trade name: KBC 1003, produced by Shinetsu Kagaku Kogyo K.K., silane B) was used in place of the silane A to obtain a reinforced rubber composition (Sample 4-2), and a bead filler composition was obtained in the same manner as in Example 4-1 except for using the Sample 4-2 as the reinforced rubber composition.

EXAMPLE 4-3

Example 4-1 was repeated except that $\gamma$-methacryloxypropyltrimethoxysilane (trade name: KBM 503, produced by Shinetsu Kagaku Kogyo K.K., silane C) was used in place of the silane A to obtain a reinforced rubber composition (Sample 4-3), and a bead filler composition was obtained in the same manner as in Example 4-1 except for using the Sample 4-3 as the reinforced rubber composition.

EXAMPLE 4-4

Example 4-1 was repeated except that $\gamma$-mercaptopropyltrimethoxysilane (trade name: KBM 803, produced by Shinetsu Kagaku Kogyo K.K., silane D) was used in place of the silane A to obtain a reinforced rubber composition (Sample 4-4), and a bead filler composition was obtained in the same manner as in Example 4-1 except for using the Sample 4-4 as the reinforced rubber composition.

EXAMPLE 4-5

Example 4-1 was repeated except that $\beta$-(3,4-epoxycyclohexyl)ethyltrimethoxysilane (trade name KBM 303, produced by Shinetsu Kagaku Kogyo K.K., silane E) was used in place of the silane A to obtain a reinforced rubber composition (Sample 4-5), and a bead filler composition was obtained in the same manner as in Example 4-1 except for using the Sample 4-5 as the reinforced rubber composition.

EXAMPLE 4-6

Example 4-1 was repeated except that 52 parts of pellets previously kneaded with 4 parts of the silane A per 100 parts of a nylon 6 (trade name: 1013B, produced Ube Kosan K.K., m.p. 221° C., molecular weight 13,000) were used to obtain a reinforced rubber composition (Sample 4-6), and a bead filler composition was obtained in the same manner as in Example 4-1 except for using the Sample 4-6 as the reinforced rubber composition.

EXAMPLE 4-7

Example 4-1 was repeated except that the amount of the 6-nylon thrown into the natural rubber was changed to 100 parts to obtain a reinforced rubber composition (Sample 4-7), and a bead filler composition was obtained in the same manner as in Example 4-1 except for using the Sample 4-7 as the reinforced rubber composition.

EXAMPLE 4-8

Example 4-1 was repeated except that the amount of the 6-nylon thrown into the natural rubber was changed to 100 parts to obtain a reinforced rubber composition (Sample 4-8), and a bead filler composition was obtained in the same manner as in Example 4-1 except for using the Sample 4-8 as the reinforced rubber composition.

EXAMPLES 4-9–4-13

Bead filler rubber compositions were obtained in the same manner as in Example 4-2 except that the composition (formulation ratios) of the respective components were changed as shown in Table 4-2.

EXAMPLES 4-14–4-16

Bead filler rubber compositions were obtained in the same manner as in Example 4-1 except for changing the kind of carbon black formulated.

COMPARATIVE EXAMPLES 4-1–4-2

Bead filler rubber compositions were obtained in the same manner as in Example 4-1 except for changing the proportions (composition) of the respective components as shown in Table 4-2 without using a reinforced rubber composition.

Measurements of the bound rubber in the respective Samples 4-1–4-8 (reinforced rubber compositions) shown in Table 4-1 were conducted as follows.

Measurement of Bound Rubber Content

Two (2) grams each of the reinforced rubber compositions were added to 200 ml of toluene at 80° C. to dissolve the rubbery components in the reinforced rubber composition, and the slurry obtained was centrifuged at room temperature to separate the solution portion from the precipitate portion. For the precipitate portion, the above operation was repeated 7 times, and thereafter, the precipitate portion was dried to obtain nylon fibers. The nylon fibers were dissolved in a solvent mixture of phenol and ortho-dichlorobenzene and analyzed by a nucleomagnetic resonance spectrum (NMR) of $^1H$ (internal reference: tetramethylsilane), and for the respective peaks of the methyl group and the methylene group attributable to rubber, the methylene group adjacent to the CO group, the methylene group adjacent to the NH group, and three other methylene groups attributable to nylon from the NMR chart, the molar ratio of nylon to rubber was determined according to the cut area method to calculate the bound rubber content. Also, the shape of the above nylon fibers was measured for about 200 fibers by a scanning type microscope with a magnification of ×10,000. The fibers were found to be extremely fine short fibers with a circular cross-section.

(note 1) to (note 4) in Table 4-2 are as follows:
(Note 1) BR: polybutadiene (UBEPOL-BR100, produced by Ube Kosan K.K.);
(note 2) SBR: styrene-butadiene copolymer rubber (SBR-1500, produced by Nippon Synthetic Rubber K.K.);
(note 3) N-330: HAF, particle size 30 m$\mu$, DBP absorption 110 ml/100 g;
N-440: FF, particle size 38 m$\mu$, DBP absorption 75 ml/100 g;
N-550: FEF, particle size 41 m$\mu$, DBP absorption 122 ml/100 g;
N-660: GPF, particle size 84 m$\mu$, DBP absorption 81 ml/100 g.

(note 4) other formulating agents:
zinc oxide: 5 parts, stearic acid: 2 parts, antioxidant: N-phenyl-N'-isopropyl-P-phenylenediamine: 1 part, vulcanization accelerator: N-oxydiethylenebenzothiazyl-2-sulfenamide: 0.8 parts, sulfur: 3 parts (4 parts only for Comparative Example 4-1).

TABLE 4-1

| | Compositions and physical properties | | | | | | |
|---|---|---|---|---|---|---|---|
| | Reinforced rubber composition (masterbatch) | | | | Nylon fiber in reinforced rubber composition (masterbatch) | | |
| | | | | | Form of fiber | | Bound rubber content (wt. %) |
| Sample | NR (parts) | Nylon-6 Kind | Nylon-6 (parts) | Silane coupling agent Kind | Silane coupling agent (parts) | Average fiber diameter ($\mu$) | Fiber length ($\mu$) |  |
| 4-1 | 100 | 1030B | 50 | Silane A | 2.0 | 0.20 | ≧15 | 23 |
| 4-2 | 100 | 1030B | 50 | Silane B | 2.0 | 0.20 | ≧15 | 18 |
| 4-3 | 100 | 1030B | 50 | Silane C | 2.0 | 0.21 | ≧15 | 18 |
| 4-4 | 100 | 1030B | 50 | Silane D | 2.0 | 0.21 | ≧15 | 18 |
| 4-5 | 100 | 1030B | 50 | Silane E | 2.0 | 0.24 | ≧15 | 15 |
| 4-6 | 100 | 1013B | 50 | Silane A | 4.0 | 0.20 | ≧15 | 23 |
| 4-7 | 100 | 1030B | 100 | Silane A | 2.0 | 0.28 | ≧15 | 18 |
| 4-8 | 100 | 1030B | 20 | Silane A | 2.0 | 0.20 | ≧15 | 22 |

TABLE 4-2

| | | | Example | | | | | | | | | |
|---|---|---|---|---|---|---|---|---|---|---|---|---|
| | | | 4-1 | 4-2 | 4-3 | 4-4 | 4-5 | 4-6 | 4-7 | 4-8 | 4-9 | 4-10 |
| Composition | Reinforced rubber composition | Kind | Sample 4-1 | Sample 4-2 | Sample 4-3 | Sample 4-4 | Sample 4-5 | Sample 4-6 | Sample 4-7 | Sample 4-8 | Sample 4-1 | Sample 4-1 |
| | | (parts) | 15 | 15 | 15 | 15 | 15 | 15 | 10 | 30 | 30 | 15 |
| | NR | (parts) | 90 | 90 | 90 | 90 | 90 | 90 | 95 | 80 | 80 | 90 |
| | BR$^{(1)}$ | (parts) | — | — | — | — | — | — | — | — | — | — |
| | SBR$^{(2)}$ | (parts) | — | — | — | — | — | — | — | — | — | — |
| | Carbon black$^{(3)}$ | Kind | N-330 | N-330 | N-330 | N-330 | N-330 | N-330 | N-330 | N-330 | N-330 | N-330 |
| | | (parts) | 50 | 50 | 50 | 50 | 50 | 50 | 50 | 50 | 50 | 60 |
| | Thermosetting resin | (parts) | — | — | — | — | — | — | — | — | — | — |
| | Hexamethylenetetramine | (parts) | — | — | — | — | — | — | — | — | — | — |
| | Other formulating agents | | (4) | (4) | (4) | (4) | (4) | (4) | (4) | (4) | (4) | (4) |
| Ratio of Nylon based on total rubber | | (PHR) | 5 | 5 | 5 | 5 | 5 | 5 | 5 | 5 | 10 | 5 |
| Bead filler rubber composition ML$_{1+4}$ | | (100° C.) | 60 | 61 | 61 | 60 | 63 | 60 | 62 | 59 | 61 | 71 |
| Vulcanized product M$_{50}$ | | (kg/cm$^2$) | 60 | 61 | 60 | 60 | 64 | 59 | 64 | 58 | 83 | 74 |
| Vulcanized product tensile strength | | (kg/cm$^2$) | 278 | 280 | 270 | 268 | 260 | 280 | 264 | 286 | 270 | 250 |
| Vulcanized product flexing number | | (times) | 8000 | 7800 | 8000 | 7500 | 7000 | 8000 | 7000 | 7000 | 2000 | 3000 |

TABLE 4-2-continued

| | | | | | | | | | | Comparative | |
| | | | | | Example | | | | | Example | |
| | | | 4-11 | 4-12 | 4-13 | 4-14 | 4-15 | 4-16 | | 4-1 | 4-2 |
|---|---|---|---|---|---|---|---|---|---|---|---|
| Vulcanized product hardness | | | 84 | 84 | 84 | 83 | 85 | 84 | 85 | 84 | 86 | 84 |
| Composition | Reinforced rubber composition | Kind | Sample 4-1 | Sample 4-1 | Sample 4-1 | Sample 4-1 | Sample 4-1 | Sample 4-1 | — | — |
| | | (parts) | 30 | 15 | 15 | 15 | 15 | 15 | | |
| | NR | (parts) | 50 | 70 | 70 | 70 | 70 | 70 | 100 | 100 |
| | BR[1] | (parts) | — | 20 | 20 | 20 | 20 | 20 | — | — |
| | SBR[2] | (parts) | 30 | — | — | — | — | — | — | — |
| | Carbon black[3] | Kind | N-330 | N-330 | N-330 | N-440 | N-550 | N-660 | N-330 | N-330 |
| | | (parts) | 50 | 60 | 50 | 50 | 50 | 50 | 70 | 80 |
| | Thermosetting resin | (parts) | — | 5 | — | — | — | — | — | — |
| | Hexamethylenetetramine | (parts) | — | 0.5 | — | — | — | — | — | — |
| | Other formulating agents | | (4) | (4) | (4) | (4) | (4) | (4) | (4) | (4) |
| Ratio of Nylon based on total rubber | | (PHR) | 10 | 5 | 5 | 5 | 5 | 5 | 0 | 0 |
| Bead filler rubber composition ML$_{1+4}$ | | (100° C.) | 62 | 74 | 61 | 56 | 58 | 53 | 90 | unmeasurable |
| Vulcanized product M$_{50}$ | | (kg/cm$^2$) | 68 | 96 | 56 | 50 | 54 | 52 | 42 | 51 |
| Vulcanized product tensile strength | | (kg/cm$^2$) | 244 | 190 | 260 | 250 | 240 | 220 | 228 | 193 |
| Vulcanized product flexing number | | (times) | 3000 | 1500 | 7000 | 8000 | 7000 | 7000 | >1000 | >1000 |
| Vulcanized product hardness | | | 85 | 91 | 84 | 83 | 84 | 82 | 80 | 83 |

In the following Examples and Comparative Examples the Mooney viscosity ML$_{1+4}$ (100° C.) of the rubber composition was measured following JIS K6300, the tensile modulus of the vulcanized product following JIS K6301 and the picoabrasion following ASTM D2228. Wet skid resistance was measured by use of a portable skid tester, and by use of Safety Walk (type B) of 3M Co.

The compositions of the reinforced rubber compositions (formulated ratios) in the following Examples 5-1-5-14 and Comparative Example 5-1, the compositions of the cap tread rubber compositions (formulated ratios) of the present invention and the physical properties of the rubber compositions for a cap tread of the present invention are summarized in Table 5-1 and Table 5-2 shown below.

EXAMPLE 5-1

Into a brabender plastograph set at 220° C., 50 r.p.m., 100 parts of a natural rubber (NR) with a melt viscosity of 1×10$^6$ poise and 1.0 part of an antioxidant of N-(3-methacryloyloxy-2-hydroxypropyl)-N'-phenyl-p-phenylenediamine [Noclac G-1, Oouchi Shinko Kagaku Kogyo K.K.] were thrown and, after kneading for 30 seconds, 51 parts of pellets prepared by previously blending 100 parts by weight of a nylon 6 (trade name: 1030B, produced by Ube Kosan K.K., m.p. 221° C., molecular weight 30,000) with 2 parts by weight of N-β(aminoethyl)γ-aminopropyltrimethoxysilane (trade name: KMB603, produced by Shinetsu Kagaku Kogyo K.K., hereinafter called Silane A) were thrown, followed by kneading for 13 minutes (during this period, the temperature in the brabender was elevated to 230° C.), to obtain a kneaded product. The kneaded product obtained was extruded into a strand by use of a 20 mmφ extruder (produced by Haake Co.) having a circular die with an inner diameter of nozzle of 2 mm and a ratio of length to inner diameter (L/D) of 2, and then the extrudate was wound up on a bobbin at a draft ratio of 10 (at speed of 38.8 m/min.) via guide rolls set at 3 m immediately below the nozzle. About 500 of the wound up products were bundled into a sheet (thickness about 2 mm, width about 150 mm), and the sheet was roll stretched to about 10-fold through a pair of rolling rolls at a roll gap of 0.2 mm and a temperature of 60° C. to obtain a reinforced rubber composition (masterbatch) (Sample 5-1).

Next, by means of a banbury set at 90° C., 77 r.p.m., the formulation components of the recipe shown in Table 5-2 excluding the vulcanization accelerator and sulfur were kneaded to obtain a kneaded product, and subsequently, the kneaded product was kneaded with an accelerating agent and sulfur on 10 inch rolls, which was then rolled out into a sheet, followed by vulcanization in a mold to obtain a vulcanized product. Vulcanization was conducted at 145° C. for 40 minutes.

EXAMPLE 5-2

Example 5-1 was repeated except that vinyltris(β-methoxyethoxy)silane (trade name: KBC 1001, produced by Shinetsu Kagaku Kogyo K.K., silane B) was used in place of the silane A to obtain a reinforced rubber composition (Sample 5-2), and a rubber composition for a cap tread was obtained in the same manner as in Example 5-1 except for using the Sample 5-2 as the reinforced rubber composition.

EXAMPLE 5-3

Example 5-1 was repeated except that γ-methaoryloxypropyltrimethoxysilane (trade name: KBM 503, produced by Shinetsu Kagaku Kogyo K.K., silane C) was used in place of the silane A to obtain a reinforced rubber composition (Sample 5-3), and a rubber composition for a cap tread was obtained in the same manner as in Example 5-1 except for using the Sample 5-3 as the reinforced rubber composition.

EXAMPLE 5-4

Example 5-1 was repeated except that γ-mercaptopropyltrimethoxysilane (trade name: KBM 803, produced by Shinetsu Kagaku Kogyo K.K., silane D) was used in place of the silane A to obtain a reinforced rubber composition (Sample 5-4), and a rubber composition for a cap tread was obtained in the same manner as in Example 5-1 except for using the Sample 5-4 as the reinforced rubber composition.

EXAMPLE 5-5

Example 5-1 was repeated except that β-(3,4-epoxycyclohexyl)ethyltrimethoxysilane (trade name KBM 303, produced by Shinetsu Kagaku Kogyo K.K., silane E) was used in place of the silane A to obtain a reinforced rubber composition (Sample 5-5), and a rubber composition for a cap tread was obtained in the same manner as in Example 5-1 except for using the Sample 5-5 as the reinforced rubber composition.

EXAMPLE 5-6

Example 5-1 was repeated except that 52 parts of pellets previously kneaded with 4 parts of the silane A per 100 parts of a nylon 6 (trade name: 1013B, produced Ube Kosan K.K., m.p. 221° C., molecular weight 13,000) were used to obtain a reinforced rubber composition (Sample 5-6), and a rubber composition for a cap tread was obtained in the same manner as in Example 5-1 except for using the Sample 5-6 as the reinforced rubber composition.

EXAMPLE 5-7

Example 5-1 was repeated except that the amount of the 6-nylon thrown into the natural rubber was changed to 100 parts to obtain a reinforced rubber composition (Sample 7), and a rubber composition for a cap tread was obtained in the same manner as in Example 5-1 except for using the Sample 5-7 as the reinforced rubber composition.

EXAMPLE 5-8

Example 5-1 was repeated except that the amount of the 6-nylon thrown into the natural rubber was changed to 100 parts to obtain a reinforced rubber composition (Sample 5-8), and a rubber composition for a cap tread was obtained in the same manner as in Example 5-1 except for using the Sample 5-8 as the reinforced rubber composition.

EXAMPLES 5-9–5-11

Rubber compositions for a cap tread were obtained in the same manner as in Example 5-2 except that the composition (formulation ratios) of the respective components were changed as shown in Table 5-2.

EXAMPLES 5-12–5-14

Rubber compositions for a cap tread were obtained in the same manner as in Example 5-1 except for changing the kind of carbon black formulated.

COMPARATIVE EXAMPLE 5-1

A rubber composition for a cap tread was obtained in the same manner as in Example 5-1 except for changing the proportions (composition) of the respective components as shown in Table 5-2 without use of reinforced rubber composition.

Measurement of the bound rubber in the respective Samples 5-1–5-8 (reinforced rubber compositions) shown in Table 5-1 were conducted in the same manner as mentioned above.

The (note 1) to (note 4) in Table 5-2 are as follows:
(note 1) BR: polybutadiene (UBEPOL-BR100, produced by Ube Kosan K.K.);
(note 2) N-110: SAF, particle size 18 mμ, DBP absorption 115 ml/100 g;
N-220: ISAF, particle size 21 mμ, DBP absorption 117 ml/100 g;
N-330: HAF, particle size 30 mμ, DBP absorption 110 ml/100 g;
N-440: FF, particle size 38 mμ, DBP absorption 75 ml/100 g.
N-330: FEF, particle size 41 mμ, DBP absorption 122 ml/100 g;
(note 3) other formulating agents:
zinc oxide: 3 parts, stearic acid: 2 parts, antioxidant: N-phenyl-N'-isopropyl-P-phenylenediamine: 1 part, vulcanization accelerator: N-oxydiethylene-benzothiazyl-2-sulfenamide: 0.8 parts, sulfur: 1.7 parts.

TABLE 5-1

| | Composition and physical properties | | | | | | | |
|---|---|---|---|---|---|---|---|---|
| | Reinforced rubber composition (masterbatch) (wt. parts) | | | | | Nylon fiber in reinforced rubber composition | | Bound rubber content (wt. %) |
| | | Nylon-6 | | Silane coupling agent* | | Form of fibers | | |
| Samples | Amount of NR | Kind | Amount | Kind | Amount | Average fiber diameter (μ) | Fiber length (μ) | |
| Sample 5-1 | 100 | 1030B | 50 | Silane A | 2.0 | 0.20 | ≧15 | 23 |
| Sample 5-2 | 100 | 1030B | 50 | Silane B | 2.0 | 0.20 | ≧15 | 18 |
| Sample 5-3 | 100 | 1030B | 50 | Silane C | 2.0 | 0.21 | ≧15 | 18 |
| Sample 5-4 | 100 | 1030B | 50 | Silane D | 2.0 | 0.21 | ≧15 | 18 |
| Sample 5-5 | 100 | 1030B | 50 | Silane E | 2.0 | 0.24 | ≧15 | 15 |
| Sample 5-6 | 100 | 1013B | 50 | Silane A | 4.0 | 0.20 | ≧15 | 23 |
| Sample 5-7 | 100 | 1030B | 100 | Silane A | 2.0 | 0.28 | ≧15 | 18 |
| Sample 5-8 | 100 | 1030B | 20 | Silane A | 2.0 | 0.20 | ≧15 | 22 |

*Amount of silane coupling agent is parts based on 100 parts of nylon.

TABLE 5-2

| | | | Example 5-1 | Example 5-2 | Example 5-3 | Example 5-4 | Example 5-5 | Example 5-6 | Example 5-7 | Example 5-8 |
|---|---|---|---|---|---|---|---|---|---|---|
| | | Kind | Sample 5-1 | Sample 5-2 | Sample 5-3 | Sample 5-4 | Sample 5-5 | Sample 5-6 | Sample 5-7 | Sample 5-8 |
| Formulation(3) | Reinforced rubber composition | (parts) | 15 | 15 | 15 | 15 | 15 | 15 | 10 | 30 |
| | Natural rubber | (parts) | 10 | 10 | 10 | 10 | 10 | 10 | 15 | 15 |
| | BR(1) | (parts) | — | — | — | — | — | — | — | — |

TABLE 5-2-continued

|  |  |  |  |  |  |  |  |  |  |
|---|---|---|---|---|---|---|---|---|---|
| SBR 1712 | (parts) | 110 | 110 | 110 | 110 | 110 | 110 | 110 | 82.5 |
|  | Kind | N-330 | N-330 | N-330 | N-330 | N-330 | N-330 | N-330 | N-330 |
| Carbon black[(2)] | (parts) | 80 | 80 | 80 | 80 | 80 | 80 | 80 | 80 |
| Aromatic oil | (parts) | 5 | 5 | 5 | 5 | 5 | 5 | 5 | 12.5 |
| Ratio of Nylon based on total rubber |  | 5 | 5 | 5 | 5 | 5 | 5 | 5 | 5 |
| Formulated products $ML_{1+4}$ | (100° C.) | 56 | 56 | 58 | 59 | 58 | 60 | 56 | 55 |
| 300% Tensile modulus | (kg/cm²) | 129 | 128 | 130 | 132 | 130 | 135 | 129 | 128 |
| Picoabrasion | (index) | 131 | 130 | 129 | 131 | 132 | 129 | 131 | 124 |
| Wet skid resistance | (index)* | 105 | 103 | 104 | 103 | 104 | 102 | 104 | 105 |

|  |  |  | Example 5-9 | Example 5-10 | Example 5-11 | Example 5-12 | Example 5-13 | Example 5-14 | Comparative Example 5-1 |
|---|---|---|---|---|---|---|---|---|---|
| For-mula-tion[(3)] | Reinforced rubber composition | Kind | Sample 1 5-1 | Sample 1 5-1 | Sample 1 5-1 | Sample 1 5-1 | Sample 1 5-1 | Sample 1 5-1 |  |
|  |  | (parts) | 15 | 9 | 30 | 30 | 30 | 30 | — |
|  | Natural rubber | (parts) | — | 14 | — | — | — | — | 20 |
|  | BR[(1)] | (parts) | 27.5 | — | — | — | — | — | — |
|  | SBR 1712 | (parts) | 96.3 | 110 | 110 | 110 | 110 | 110 | 110 |
|  |  | Kind | N-330 | N-330 | N-110 | N-220 | N-440 | N-550 | N-330 |
|  | Carbon black[(2)] | (parts) | 80 | 80 | 70 | 70 | 70 | 70 | 80 |
|  | Aromatic oil | (parts) | 1.2 | 5 | 5 | 5 | 5 | 5 | 5 |
| Ratio of Nylon based on total rubber |  |  | 5 | 3 | 10 | 10 | 10 | 10 | — |
| Formulated products $ML_{1+4}$ | (100° C.) |  | 54 | 57 | 52 | 50 | 47 | 49 | 55 |
| 300% Tensile modulus | (kg/cm²) |  | 122 | 130 | 120 | 131 | 128 | 130 | 94 |
| Picoabrasion | (index) |  | 140 | 123 | 130 | 126 | 124 | 123 | 114 |
| Wet skid resistance | (index)* |  | 100 | 102 | 104 | 105 | 103 | 104 | 100 |

*Wet skid resistance is represented as index with comparative example 1 being 100. Wet skid resistance increases as index becomes larger.

In the following, the Mooney viscosity of the rubber composition was measured following JIS K6300, the hardness and tear strength of the vulcanized product following JIS K6301 and the picoabrasion following ASTM D2228. Cut resistance was measured with a test strip of 30×30×2 mm by a Du Pont impact tester. However, the blade tip angle of the receiving stand was made 45°, the diameter 1.27 cm, and the falling dart weight 300 g, and the point at which half of the 10 test strips were damaged was determined as the breaking point.

The compositions of the reinforced rubber compositions (formulated ratios) in the following Examples 6-1–6-10 and Comparative Examples 6-1–6-4, the compositions (formulated ratios) of the rubber compositions for rubber crawler of the present invention, and the physical properties of the rubber compositions for rubber crawler of the present invention are summarized in Table 6-1 and Table 6-2 shown below.

EXAMPLE 6-1

Into a brabender plastograph set at 220° C., 50 r.p.m., 100 parts of a natural rubber (NR) with a melt viscosity of $1 \times 10^6$ poise and 1.0 part of an antioxidant of N-(3-methacryloyloxy-2-hydroxypropyl)-N'-phenyl-p-phenylenediamine [Noclac G-1, Oouchi Shinko Kagaku Kogyo K.K.] were thrown and, after kneading for 30 seconds, 51 parts of pellets prepared by previously blending 100 parts by weight of a nylon 6 (trade name: 1030B, produced by Ube Kosan K.K., m.p. 221° C., molecular weight 30,000) with 2 parts by weight of N-β(aminoethyl)γ-aminopropyltrimethoxysilane (trade name: KMB603, produced by Shinetsu Kagaku Kogyo K.K., hereinafter called Silane A) were thrown in, followed by kneading for 13 minutes (during this period, the temperature in the brabender was elevated to 230° C.), to obtain a kneaded product. The kneaded product obtained was extruded into a strand by use of a 20 mmφ extruder (produced by Haake Co.) having a circular die with an inner diameter of nozzle of 2 mm and a ratio of length to inner diameter (L/D) of 2, and then the extrudate was wound up on a bobbin at a draft ratio of 10 (at speed of 38.8 m/min.) via guide rolls set at 3 m immediately below the nozzle. About 500 of the wound up products were bundled into a sheet (thickness about 2 mm, width about 150 mm), and the sheet was roll stretched to about 10-fold through a pair of rolling rolls at a roll gap of 0.2 mm and a temperature of 60° C. to obtain a reinforced rubber composition (masterbatch) (Sample 6-1).

Thereafter, by means of a banbury set at 90° C., 77 r.p.m., the formulation components of the recipe shown in Table 6-2 excluding the vulcanization accelerator and sulfur were kneaded to obtain a kneaded product, and subsequently the kneaded product was kneaded with an accelerating agent and sulfur on 10 inch rolls, which was then rolled out into a sheet, followed by vulcanization in a mold to obtain a vulcanized product. Vulcanization was conducted at 145° C. for 40 minutes.

EXAMPLE 6-2

Example 6-1 was repeated except that vinyltris(β-methoxyethoxy)silane (trade name: KBC 1003, produced by Shinetsu Kagaku Kogyo K.K., silane B) in place of the silane A to obtain a reinforced rubber composition (Sample 2), and a rubber composition for a rubber crawler was obtained in the same manner as in Example 6-1 except for using the Sample 6-2 as the reinforced rubber composition.

EXAMPLE 6-3

Example 6-1 was repeated except that γ-methacryloxypropyltrimethoxysilane (trade name: KBM 503, produced by Shinetsu Kagaku Kogyo K.K., silane C) in place of the silane A to obtain a reinforced rubber composition (Sample 6-3), and a rubber composition for a rubber crawler was obtained in the same manner as in Example 6-1 except for using the Sample 6-3 as the reinforced rubber composition.

EXAMPLE 6-4

Example 6-1 was repeated except that γ-mercaptopropyltrimethoxysilane (trade name: KBM 803, produced by Shinetsu Kagaku Kogyo K.K., silane D) in place of the silane A to obtain a reinforced rubber composition (Sample 6-4), and a rubber composition for a rubber crawler was obtained in the same manner as in Example 6-1 except for using the Sample 6-4 as the reinforced rubber composition.

EXAMPLE 6-5

Example 6-1 was repeated except that β-(3,4-epoxycyclohexyl)ethyltrimethoxysilane (trade name KBM 303, produced by Shinetsu Kagaku Kogyo K.K., silane E) in place of the silane A to obtain a reinforced rubber composition (Sample 6-5), and a rubber composition for a rubber crawler was obtained in the same manner as in Example 6-1 except for using the Sample 6-5 as the reinforced rubber composition.

EXAMPLE 6-6

Example 6-1 was repeated except that 52 parts of pellets previously kneaded with 4 parts of the silane A per 100 parts of a nylon 6 (trade name: 1013B, produced Ube Kosan K.K., m.p. 221° C., molecular weight 13,000) were used to obtain a reinforced rubber composition (Sample 6-6), and a rubber composition for a rubber crawler was obtained in the same manner as in Example 6-1 except for using the Sample 6-6 as the reinforced rubber composition.

EXAMPLE 6-7

Example 6-1 was repeated except that the amount of the 6-nylon thrown into the natural rubber was changed to 100 parts to obtain a reinforced rubber composition (Sample 6-7), and a rubber composition for a rubber crawler was obtained in the same manner as in Example 6-1 except for using the Sample 6-7 as the reinforced rubber composition.

EXAMPLE 6-8

Example 6-1 was repeated except that the amount of the 6-nylon thrown into the natural rubber was changed to 100 parts to obtain a reinforced rubber composition (Sample 6-8), and a rubber composition for a rubber crawler was obtained in the same manner as in Example 6-1 except for using the Sample 6-8 as the reinforced rubber composition.

EXAMPLES 6-9–6-10

Rubber compositions for a rubber crawler were obtained in the same manner as in Example 6-2 except that the composition (formulation ratios) of the respective components were changed as shown in Table 6-2.

COMPARATIVE EXAMPLES 6-1–6-3

Rubber compositions for a rubber crawler were obtained in the same manner as in Example 6-1 except for changing the proportions (composition) of the respective components as shown in Table 6-2 without use of reinforced rubber composition.

COMPARATIVE EXAMPLE 6-4

A rubber composition for a rubber crawler was obtained in the same manner as in Example 6-1 except for using natural rubber and 5 parts of nylon cut fibers. The results are summarized in Table 6-2.

Measurement of the bound rubber in the respective Samples 6-1–6-8 (reinforced rubber compositions) shown in Table 6-1 were conducted in the same manner as mentioned above.

The (note 1) to (note 3) in Table 2 are as follows:
(note 1) BR: polybutadiene (UBEPOL-BR100, produced by Ube Kosan K.K.);
(note 2) cut fiber: nylon short fibers, diameter 20 μm, average length 2 mm
(note 3) other formulating agents:
zinc oxide: 3 parts, stearic acid: 2 parts, antioxidant: N-phenyl-N'-isopropyl-P-phenylenediamine: 1 part, paraffin wax 2 part, vulcanization accelerator: N-oxydiethylenebenzothiazyl-2-sulfenamide: 1 part, sulfur: 2 parts.

TABLE 6-1

| | Compositions and physical properties ||||||
|---|---|---|---|---|---|---|---|
| | Reinforced rubber composition (masterbatch) (parts) |||| Nylon fiber in reinforced rubber composition |||
| | | Nylon-6 || Silane coupling agent* || Form of fiber || Bound rubber content (%) |
| Samples | Amount of NR | Kind | Amount | Kind | Amount | Average fiber diameter (μ) | Fiber length (μ) | |
| Sample 6-1 | 100 | 1030B | 50 | Silane A | 2.0 | 0.20 | ≧15 | 23 |
| Sample 6-2 | 100 | 1030B | 50 | Silane B | 2.0 | 0.20 | ≧15 | 18 |
| Sample 6-3 | 100 | 1030B | 50 | Silane C | 2.0 | 0.21 | ≧15 | 18 |
| Sample 6-4 | 100 | 1030B | 50 | Silane D | 2.0 | 0.21 | ≧15 | 18 |
| Sample 6-5 | 100 | 1030B | 50 | Silane E | 2.0 | 0.24 | ≧15 | 15 |
| Sample 6-6 | 100 | 1013B | 50 | Silane A | 4.0 | 0.20 | ≧15 | 23 |
| Sample 6-7 | 100 | 1030B | 100 | Silane A | 2.0 | 0.28 | ≧15 | 18 |
| Sample 6-8 | 100 | 1030B | 20 | Silane A | 2.0 | 0.20 | ≧15 | 22 |

*Amount of silane coupling agent is parts based on 100 parts of nylon.

TABLE 6-2

| | | | Example 1 | Ex. 2 | Ex. 3 | Ex. 4 | Ex. 5 | Ex. 6 | Ex. 7 | Ex. 8 |
|---|---|---|---|---|---|---|---|---|---|---|
| | | Kind | Sample 6-1 | Sample 6-2 | Sample 6-3 | Sample 6-4 | Sample 6-5 | Sample 6-6 | Sample 6-7 | Sample 6-8 |
| Formula- | Reinforced rubber composition | (parts) | 15 | 15 | 15 | 15 | 15 | 15 | 10 | 30 |

TABLE 6-2-continued

| tion[3] | | | | | | | | | | |
|---|---|---|---|---|---|---|---|---|---|---|
| | Natural rubber | (parts) | 90 | 90 | 90 | 90 | 90 | 90 | 95 | 75 |
| | BR[1] | (parts) | — | — | — | — | — | — | — | — |
| | Carbon black (N-220) | (parts) | 45 | 45 | 45 | 45 | 45 | 45 | 45 | 45 |
| | Aromatic oil | (parts) | 5 | 5 | 5 | 5 | 5 | 5 | 5 | 5 |
| | Cut fiber[2] | (parts) | — | — | — | — | — | — | — | — |
| Ratio of Nylon based on total rubber (PHR) | | | 5 | 5 | 5 | 5 | 5 | 5 | 5 | 5 |
| Formulated products ML | | (100° C.) | 56 | 55 | 56 | 55 | 55 | 55 | 56 | 55 |
| Hardness | | (JIS-A) | 69* | 69* | 69* | 69* | 69* | 69* | 69* | 69* |
| Tear strength | | (kg/cm) | 132 | 130 | 129 | 127 | 127 | 128 | 131 | 129 |
| Picoabrasion | | (index) | 134 | 133 | 132 | 131 | 130 | 133 | 132 | 133 |
| Cut resistance* | | (index) | 141 | 140 | 141 | 139 | 139 | 140 | 141 | 140 |
| Overall evaluation | | | o | o | o | o | o | o | o | o |

| | | | Ex. 9 | Ex. 10 | Comparative Ex. 6-1 | Comparative Ex. 6-2 | Comparative Ex. 6-3 | Comparative Ex. 6-4 |
|---|---|---|---|---|---|---|---|---|
| | | Kind | Sample 6-1 | Sample 6-1 | — | — | — | — |
| For-mula-tion[3] | Reinforced rubber composition | (parts) | 9 | 15 | — | — | — | — |
| | Natural rubber | (parts) | 94 | 70 | 100 | 100 | 80 | 100 |
| | BR[1] | (parts) | — | 20 | — | — | 20 | — |
| | Carbon black (N-220) | (parts) | 45 | 45 | 50 | 60 | 50 | 45 |
| | Aromatic oil | (parts) | 5 | 5 | 5 | 5 | 5 | 5 |
| | Cut fiber[2] | (parts) | — | — | — | — | — | 5 |
| Ratio of Nylon based on total rubber (PHR) | | | 3 | 5 | 0 | 0 | 0 | 5 |
| Formulated product ML | | (100° C.) | 55 | 56 | 62 | 74 | 63 | 63 |
| Hardness | | (JIS-A) | 69* | 69* | 65* | 70* | 65* | 68* |
| Tear strength | | (kg/cm) | 137 | 122 | 128 | 111 | 104 | 105 |
| Picoabrasion | | (index) | 127 | 149 | 116 | 134 | 131 | 102 |
| Cut resistance* | | (index) | 129 | 138 | 100 | 105 | 93 | 118 |
| Overall evaluation | | | o | o | x | x | x | x |

*Cut resistance is represented as index with comparative example 1 being 100 and increases as the index becomes larger.
o: good    x: bad

We claim:

1. A bead filler rubber composition comprising (A) a reinforced rubber composition comprising 100 parts by weight of a vulcanizable rubber including 5 to 100 parts by weight of fie short fibers of a fiber-forming polyamide buried therein, said polyamide and said vulcanizable rubber being bonded through a silane coupling agent, (B) a diene type rubber and (C) carbon black, and also satisfying the conditions (I) to (IV) below:
   (I) the amount of said polyamide is 2 to 20 parts by weight per 100 parts by weight of the total rubber;
   (II) the proportion of the total amount of natural rubber and synthetic polyisoprene is 55 to 100% by weight based on the total rubber components in the component (A) and the component (B);
   (III) the amount of the carbon black is 50 to 70 parts by weight based on 100 parts by weight of the total rubber; and
   (IV) the vulcanized product obtained has a 50% modulus of 30 kg/cm² or more.

2. A composition for a cap tread comprising (A) a reinforced rubber composition comprising a vulcanizable rubber including fine short fibers of a fiber-forming polyamide buried therein, said polyamide and said vulcanizable rubber being bonded through a silane coupling agent, (B) a diene type rubber and (C) carbon black, and also satisfying the conditions (I) to (IV) below:
   (I) the amount of said polyamide is 1 to 15 parts by weight per 100 parts by weight of the total rubber;
   (II) the proportion of the total amount of natural rubber and synthetic polyisoprene is 5 to 40% by weight based on the total rubber components in the component (A) and the component (B);
   (III) the amount of the carbon black is 60 to 90 parts by weight based on 100 parts by weight of the total rubber; and
   (IV) the vulcanized product obtained has a 300% modulus of 100 kg/cm² or more.

3. A composition for a rubber crawler comprising (A) a reinforced rubber composition comprising a vulcanizable rubber including fine short fibers of a fiber-forming polyamide buried therein, said polyamide and said vulcanizable rubber being bonded through a silane coupling agent, (B) a diene type rubber and (C) carbon black, and also satisfying the conditions (I) to (IV) below:
   (I) the amount of said polyamide is 1 to 20 parts by weight per 100 parts by weight of the total rubber;
   (II) the proportion of the total amount of natural rubber and synthetic polyisoprene is 60 to 100% by weight based on the total rubber components in the component (A) and the component (B);
   (III) the amount of the carbon black is 30 to 60 parts by weight based on 100 parts by weight of the total rubber; and
   (IV) the vulcanized product obtained has a hardness of 55° to 75° as measured by a JIS K6301 type spring system hardness test.

4. An automobile tire comprising a cap tread having the composition as claimed in claim 2.

5. A rubber crawler comprising the composition as claimed in claim 3.

UNITED STATES PATENT AND TRADEMARK OFFICE
CERTIFICATE OF CORRECTION

PATENT NO. : 5,049,610

DATED : September 17, 1991

INVENTOR(S) : TAKAKI ET AL.

It is certified that error appears in the above-identified patent and that said Letters Patent is hereby corrected as shown below:

Claim 1, col. 59, line 39, delete "fie" and insert --fine--.

Signed and Sealed this

Twelfth Day of January, 1993

Attest:

DOUGLAS B. COMER

Attesting Officer

Acting Commissioner of Patents and Trademarks